(12) United States Patent
Peng et al.

(10) Patent No.: US 11,739,755 B2
(45) Date of Patent: Aug. 29, 2023

(54) PNEUMATIC TYPE WATER-FREE STARTING SELF-PRIMING DEVICE

(71) Applicant: JIANGSU UNIVERSITY, Zhenjiang (CN)

(72) Inventors: Guangjie Peng, Zhenjiang (CN); Jialin Du, Zhenjiang (CN); Hao Chang, Zhenjiang (CN); Shiming Hong, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/021,187

(22) PCT Filed: Dec. 29, 2021

(86) PCT No.: PCT/CN2021/142271
§ 371 (c)(1),
(2) Date: Feb. 14, 2023

(87) PCT Pub. No.: WO2023/115617
PCT Pub. Date: Jun. 29, 2023

(65) Prior Publication Data
US 2023/0243355 A1 Aug. 3, 2023

(30) Foreign Application Priority Data

Dec. 23, 2021 (CN) .......................... 202111588098.3

(51) Int. Cl.
*F04D 9/02* (2006.01)
*B01D 19/00* (2006.01)

(52) U.S. Cl.
CPC ........... *F04D 9/02* (2013.01); *B01D 19/0042* (2013.01)

(58) Field of Classification Search
CPC ............................ F04D 9/02; B01D 19/0042
See application file for complete search history.

(56) References Cited

U.S. PATENT DOCUMENTS 5,536,147 A 7/1996 Lang

FOREIGN PATENT DOCUMENTS

| CN | 103362826 A | 10/2013 |
|---|---|---|
| CN | 107605744 A | 1/2018 |
| CN | 108868890 A | 11/2018 |

(Continued)

*Primary Examiner* — Christopher P Jones
*Assistant Examiner* — Phillip Y Shao
(74) *Attorney, Agent, or Firm* — Bayramoglu Law Offices LLC

(57) ABSTRACT

Clean version of the Abstract A pneumatic type water-free starting self-priming device includes a driving device, and a gas-liquid separation chamber and an expandable gas-liquid separation chamber respectively arranged on two sides of the driving device. The driving device uses high-speed gas to drive a drive disk to rotate and drive a drive shaft to rotate. The gas-liquid separation chamber uses a telescopic piston shaft rod to generate a pressure difference between the gas-liquid separation chamber and outside to suck in water, so as to realize water suction, gas-liquid separation and water drainage. The expandable gas-liquid separation chamber uses shrinkage or expansion of volumes of inner and outer chambers to generate a pressure difference to suck in water, so as to realize water suction, gas-liquid separation and water drainage. Also, the high-speed gas from the driving device flows through the two chambers, so that air can be discharged quickly.

10 Claims, 10 Drawing Sheets

(56) References Cited

FOREIGN PATENT DOCUMENTS

| | | |
|---|---|---|
| CN | 108894992 A | 11/2018 |
| CN | 110219808 A | 9/2019 |
| CN | 110397599 A | 11/2019 |
| CN | 113464450 A | 10/2021 |

PNEUMATIC TYPE WATER-FREE STARTING SELF-PRIMING DEVICE

CROSS REFERENCE TO THE RELATED APPLICATIONS

This application is the national phase entry of International Application No. PCT/CN2021/142271, filed on Dec. 29, 2021, which is based upon and claims priority to Chinese Patent Application No. 202111588098.3, filed on Dec. 23, 2021, the entire contents of which are incorporated herein by reference.

TECHNICAL FIELD

The present disclosure relates to the field of fast self-priming devices, and specifically to a pneumatic type water-free starting self-priming device.

BACKGROUND

Centrifugal pumps are widely used in agricultural irrigation, domestic drainage, industrial fluid transportation and other fields. Since the chamber of the centrifugal pump is full of air before starting and the centrifugal force generated by the air is insufficient for water delivery, the centrifugal pump requires the feeding of water before starting. This operation is complex and time-consuming. If a vacuum pump is connected to the centrifugal pump for vacuuming, large noise and high energy consumption are caused. Therefore, the present disclosure provides a pneumatic type water-free starting self-priming device to solve the difficulty in feeding water to a centrifugal pump before starting.

SUMMARY

To overcome the drawbacks in the prior art, the present disclosure provides a pneumatic type water-free starting self-priming device. The device of the present disclosure is driven by gas, different from conventional devices which are driven by electric power, thereby reducing energy consumption. The device of the present disclosure is easy to operate and takes advantage of the structure of gas-liquid separation chambers to rapidly complete the processes of air suction, air exhaust, and filling of the chamber with water during starting. In addition, the arrangement of the different levels of gas-liquid separation ensures that the air is completely discharged. Finally, after the device stops running, the water is enclosed in the device due to the structure of the device, so that the device is always filled with water. When started again, the centrifugal pump can directly enter a normal operating state, thereby greatly improving the operational efficiency.

The above technical objective of the present disclosure is attained with the following technical means.

A pneumatic type water-free starting self-priming device is provided. The device is of a symmetrical cylinder structure, and includes a driving device, a gas-liquid separation chamber, and an expandable gas-liquid separation chamber, where the gas-liquid separation chamber and the expandable gas-liquid separation chamber are respectively arranged on two sides of the driving device, and gas acceleration channels are symmetrically arranged on the two sides of the driving device; an inner chamber of the gas-liquid separation chamber and an inner chamber of the expandable gas-liquid separation chamber are each connected to an outlet of a corresponding gas acceleration channel through a corresponding gas-liquid flow channel, and a vent valve is arranged at the connection between the outlet of the gas acceleration channel and the gas-liquid flow channel; one-way valves are arranged at an interface between the inner chamber of the gas-liquid separation chamber and the corresponding gas-liquid flow channel and at an interface between the inner chamber of the expandable gas-liquid separation chamber and the corresponding gas-liquid flow channel, and the one-way valves are arranged symmetrically about a chamber central axis;

drive shafts on the two sides of the driving device are respectively connected to drive shafts of the gas-liquid separation chamber and the expandable gas-liquid separation chamber; the drive shafts on the two sides do not interfere with each other; the driving device uses high-speed gas to drive a drive disk to rotate, to drive the drive shafts to rotate;

a telescopic piston shaft rod in the gas-liquid separation chamber is used to generate a pressure difference between the chamber and outside to suck in water, so as to realize water suction, gas-liquid separation and water drainage;

the expandable gas-liquid separation chamber uses shrinkage or expansion of volumes of inner and outer chambers thereof to generate a pressure difference to suck in water, so as to realize water suction, gas-liquid separation and water drainage; and a fixing support is arranged at a bottom of the driving device, the gas-liquid separation chamber and the expandable gas-liquid separation chamber.

Further, the driving device includes, in sequence from outside to inside, an outer shell wall of the driving device, a top gas inlet, inlets of the gas acceleration channels, the gas acceleration channels, an inner shell wall of the driving device, a tapered gas flow channel, A-side gas drive disks, B-side gas drive disks, a rhombic splitting device, a bottom B-side gas inlet, and a bottom A-side gas inlet;

the top gas inlet runs through the outer shell wall of the driving device and the inner shell wall of the driving device and is communicated with a top of the tapered gas flow channel; the bottom A-side gas inlet is provided on one side of the A-side gas drive disks, runs through the outer shell wall of the driving device and the inner shell wall of the driving device, and is communicated with a bottom of the tapered gas flow channel; the bottom B-side gas inlet is provided on one side of the B-side gas drive disks, runs through the outer shell wall of the driving device and the inner shell wall of the driving device, and is communicated with the bottom of the tapered gas flow channel; the rhombic splitting device is arranged at the bottom of the tapered gas flow channel to split air intake at the bottom into an A side and a B side;

the inlets of the gas acceleration channels are respectively communicated with the gas acceleration channels and are symmetrically arranged on the two sides of the driving device; the gas acceleration channels are tapered from bottom to top;

the tapered gas flow channel is symmetrically arranged and is tapered from bottom to top;

a plurality of the B-side gas drive disks are arranged on a drive shaft on the B side; in a gas inlet to outlet direction, a density of drive disks increases, and a dense point is close to the inlets of the gas acceleration channels; a plurality of gas flow channels and gas outlets corresponding to the gas flow channels are arranged on each of the B-side gas drive disks, a plurality of gas pores are provided on each of the gas flow channels, and pore sizes of the gas pores decrease in a proportion along the gas outlets of the gas flow channels;

the B-side gas drive disks rotate clockwise under the action of the top gas inlet and the bottom B-side gas inlet; the A-side gas drive disks are of the same structure as the B-side gas drive disks; the A-side gas drive disks and the B-side gas drive disks are arranged on two sides of the top gas inlet; the A-side gas drive disks rotate counterclockwise under the action of the top gas inlet and the bottom A-side gas inlet; and the A-side gas drive disks and the B-side gas drive disks do not interfere with each other during rotation.

Further, the gas acceleration channels each includes a first segment, a second segment and a third segment in sequence, where a radius of the second segment is 0.5 times a radius of the first segment, and a radius of the third segment is 0.5 times the radius of the second segment; the tapered gas flow channel is tapered from bottom to top, and a radius of the bottom of the tapered gas flow channel is 5 times a radius of a top of the tapered gas flow channel; three gas flow channels are arranged on each of the B-side gas drive disks, and every two adjacent gas flow channels form an angle of 120°; the gas pores are circular, and radii of the gas pores decrease to 0.8 times for several times toward the gas outlets; and the gas outlets are rectangular.

Further, the one-way valves each include a first rotating shaft, a first spring and a first baffle, where two sides of the first spring are respectively connected to a wall surface of the gas-liquid flow channel and the first baffle;

the vent valve includes spires, embedded movable blocks, a wing-shaped structure, a fixing support of the vent valve, a telescopic shaft rod of the vent valve, a baffle of the vent valve, a pulley of the vent valve, a vent baffle, a solid block, and a slide rail of the vent valve; the spires are arranged on a wall surface of the gas acceleration channel and at positions corresponding to positions of the embedded movable blocks; the embedded movable blocks are arranged in the wing-shaped structure; a number of the spires and a number of the embedded movable blocks are both 2; the wing-shaped structure is initially arranged at the fixing support of the vent valve; the telescopic shaft rod of the vent valve is connected to the wing-shaped structure and the vent baffle; the vent baffle is connected to the solid block; the solid block is connected to the baffle of the vent valve and the pulley of the vent valve; the baffle of the vent valve is vertically symmetrically arranged with respect to the pulley of the vent valve; the pulley of the vent valve operates in the slide rail of the vent valve; and the slide rail of the vent valve is arranged in the wall surface of the gas-liquid flow channel.

Further, the gas-liquid separation chamber includes, in sequence from outside to inside, water inlets of the gas-liquid separation chamber, an outer shell wall of the gas-liquid separation chamber, spiral gas-liquid separation devices, an inner shell wall of the gas-liquid separation chamber, the telescopic piston shaft rod and a hexagonal concave-convex impeller, where the spiral gas-liquid separation devices include fixed spiral gas-liquid separation devices and first rotary spiral gas-liquid separation devices; the fixed spiral gas-liquid separation devices are arranged at inlets on two sides, penetrate the inner shell wall of the gas-liquid separation chamber, and each include a second rotating shaft, a second baffle, a second spring, first spiral blades, a first rotary disc, an impeller of the fixed spiral gas-liquid separation device and a rotating body; the second rotating shaft is connected to the outer shell wall of the gas-liquid separation chamber and the second baffle; the second spring is connected to the second baffle and the rotating body; the first rotary disc is connected to the rotating body and the impeller of the fixed spiral gas-liquid separation device; the first rotary disc is configured for rotating the impeller of the fixed spiral gas-liquid separation device; a plurality of the first spiral blades are arranged on a surface of the rotating body;

the first rotary spiral gas-liquid separation devices penetrate the inner shell wall of the gas-liquid separation chamber, and a plurality of the first rotary spiral gas-liquid separation devices are arranged, each including a second rotary disc, second spiral blades and an impeller of the first rotary spiral gas-liquid separation device; the second rotary disc is of the same structure as the first rotary disc, and is configured for rotating the first rotary spiral gas-liquid separation device and the impeller of the first rotary spiral gas-liquid separation device; a plurality of the second spiral blades are arranged on a surface of each of the first rotary spiral gas-liquid separation devices;

a plurality of the telescopic piston shaft rods are arranged, each including a ball of the telescopic piston shaft rod, a fixed shaft rod, a movable shaft rod, a third spring, first flow channels, a glass tube of the telescopic piston shaft rod, a piston, a fourth spring, an impeller of the telescopic piston shaft rod, second flow channels, a piston baffle, a fifth spring, a third rotating shaft and a third baffle; the ball of the telescopic piston shaft rod is arranged in an outer telescopic slide rail and is connected to one end of the fixed shaft rod; the movable shaft rod is connected to the fixed shaft rod, is symmetrically arranged with respect to the third spring, and is arranged in the glass tube of the telescopic piston shaft rod together with the third spring; the first flow channels are arranged outside the glass tube of the telescopic piston shaft rod, and a plurality of the first flow channels are symmetrically arranged with respect to a central line of the fixed shaft rod; the piston is connected to an other end of the fixed shaft rod, and each of two sides of the piston is provided with the piston baffle; a plurality of the second flow channels are arranged on the piston baffle on each of the two sides; the fourth spring and the impeller of the telescopic piston shaft rod are arranged in each of the second flow channels; the fifth spring is connected to the piston baffle and the third baffle; the third rotating shaft is connected to the third baffle and the inner shell wall of the gas-liquid separation chamber; the fifth spring, the third rotating shaft and the third baffle are symmetrically arranged with respect to a center of the telescopic piston shaft rod;

the hexagonal concave-convex impeller is provided with an outer telescopic slide rail, shaft beads, a shaft bead slide rail, an external drive shaft of the gas-liquid separation chamber, and telescopic shaft rods of the hexagonal concave-convex impeller; the outer telescopic slide rail surrounds the impeller and has a telescopic effect; the shaft beads are arranged in the shaft bead slide rail, and surround the shaft bead slide rail; the external drive shaft of the gas-liquid separation chamber is coaxial with the B-side gas drive disks, and drives the hexagonal concave-convex impeller to rotate clockwise; and a plurality of the telescopic shaft rods of the hexagonal concave-convex impeller are arranged in the hexagonal concave-convex impeller, and each have one end integrally welded to the shaft bead slide rail and an other end connected to the ball of the telescopic piston shaft rod.

Further, two first spiral blades are arranged; two second spiral blades are arranged; three telescopic shaft rods of the hexagonal concave-convex impeller are arranged, and every two adjacent telescopic shaft rods form an angle of 120°; six first flow channels are evenly arranged, with three first flow channels being arranged on each side; and six second flow channels are evenly arranged, with three second flow channels being arranged on each side.

Further, four first rotary spiral gas-liquid separation devices are symmetrically arranged with respect to the gas-liquid separation chamber, and every two first rotary spiral gas-liquid separation devices are spaced apart by 60°; the first rotary spiral gas-liquid separation device is spaced apart from the fixed spiral gas-liquid separation device by 60°; and six telescopic piston shaft rods are symmetrically arranged with respect to the gas-liquid separation chamber, and every two adjacent telescopic piston shaft rods are spaced apart by 60°.

Further, the expandable gas-liquid separation chamber includes, in sequence from outside to inside, a water inlet of the expandable gas-liquid separation chamber, a one-way slide valve, an outer shell wall of the expandable gas-liquid separation chamber, second rotary spiral gas-liquid separation devices, an inner shell wall of the expandable gas-liquid separation chamber, variable-opening-degree sliding gas-liquid separation shaft rods and a triangular concave-convex impeller;

the one-way slide valve is arranged in the water inlet of the expandable gas-liquid separation chamber, is of a symmetrical structure, and includes a hollow sliding plate, an upper fixing block, an upper baffle, a primary slide rail, a sixth spring, a lower baffle, a secondary slide rail, built-in water inlets, a built-in impeller of the one-way slide valve, and a lower fixing block; the hollow sliding plate is hollow inside, and is connected to the secondary slide rail; a water flow enters a flow channel inside the hollow sliding plate through the built-in water inlets; a plurality of the built-in water inlets are arranged; the upper baffle and the lower baffle are connected to the primary slide rail and the secondary slide rail; the upper fixing block limits a movement of the upper baffle toward a top of the hollow sliding plate; the lower fixing block limits a movement of the lower baffle toward a bottom of the hollow sliding plate; the sixth spring is arranged between the upper baffle and the lower baffle; the primary slide rail is arranged on a wall surface of the water inlet of the expandable gas-liquid separation chamber; the built-in impeller of the one-way slide valve is arranged inside the hollow sliding plate, and allows a corresponding bottom water flow to pass therethrough;

a plurality of outer chamber wall constriction/expansion devices are arranged at the outer shell wall of the expandable gas-liquid separation chamber, and each include a glass tube of the outer chamber wall constriction/expansion device, a piston of the outer chamber wall constriction/expansion device, and a seventh spring; the piston of the outer chamber wall constriction/expansion device is symmetrically arranged with respect to the seventh spring; the piston of the outer chamber wall constriction/expansion device and the seventh spring are both arranged inside the glass tube of the outer chamber wall constriction/expansion device;

the second rotary spiral gas-liquid separation devices are of the same structure as the first rotary spiral gas-liquid separation devices, and a plurality of the second rotary spiral gas-liquid separation devices are arranged;

three magnetic telescopic shaft rods are symmetrically arranged with respect to the expandable gas-liquid separation chamber, every two adjacent magnetic telescopic shaft rods are spaced apart by 120°, and each of the magnetic telescopic shaft rods includes eighth springs, a magnetic sliding shaft rod, a built-in slide rail, a baffle of the magnetic telescopic shaft rod, a pulley of the magnetic telescopic shaft rod, and a magnetic fixed shaft rod; a plurality of the eighth springs are arranged inside the magnetic sliding shaft rod, and are in an outer chamber section of the expandable gas-liquid separation chamber; magnetism of the magnetic sliding shaft rod repels magnetism of a magnetic bump; the baffle of the magnetic telescopic shaft rod and the pulley of the magnetic telescopic shaft rod are arranged inside the built-in slide rail; the built-in slide rail is connected to the magnetic sliding shaft rod and the magnetic fixed shaft rod; magnetism of the magnetic fixed shaft rod attracts magnetism of a magnetic pit; the magnetic sliding shaft rod is connected to the outer shell wall of the expandable gas-liquid separation chamber and penetrates the inner shell wall of the expandable gas-liquid separation chamber; the magnetic fixed shaft rod is connected to the inner shell wall of the expandable gas-liquid separation chamber; the baffle of the magnetic telescopic shaft rod is symmetrically arranged with respect to the pulley of the magnetic telescopic shaft rod;

inner chamber wall constriction/expansion devices are of the same structure as the outer chamber wall constriction/expansion devices, and a plurality of the inner chamber wall constriction/expansion devices are arranged at the inner shell wall of the expandable gas-liquid separation chamber;

the variable-opening-degree sliding gas-liquid separation shaft rods are of a symmetrical structure, three variable-opening-degree sliding gas-liquid separation shaft rods are arranged with respect to the expandable gas-liquid separation chamber, every two adjacent variable-opening-degree sliding gas-liquid separation shaft rods form an angle of 120°, and each of the variable-opening-degree sliding gas-liquid separation shaft rods includes a primary ball, a connecting shaft, a secondary ball, a constriction/expansion shaft rod, built-in impellers of the constriction/expansion shaft rod, a tenth spring, an expandable flow channel, a slide block, a baffle of the variable-opening-degree sliding gas-liquid separation shaft rod, a pulley of the variable-opening-degree sliding gas-liquid separation shaft rod, a fourth rotating shaft, an eleventh spring and a fourth baffle; the primary ball is movable in a peripheral slide rail, and is connected to the connecting shaft; the secondary ball is connected to the constriction/expansion shaft rod on two sides, to change degrees of opening of the constriction/expansion shaft rod on the two sides; a plurality of the built-in impellers of the constriction/expansion shaft rod are arranged in the constriction/expansion shaft rod; the tenth spring is arranged in the expandable flow channel, and two ends of the tenth spring are connected to the built-in impellers of the constriction/expansion shaft rod on the two sides; the eleventh spring is connected to the constriction/expansion shaft rod and the fourth baffle; the fourth rotating shaft is connected to the inner shell wall of the expandable gas-liquid separation chamber and the fourth baffle; the slide block is connected to the baffle of the variable-opening-degree sliding gas-liquid separation shaft rod and the pulley of the variable-opening-degree sliding gas-liquid separation shaft rod; the baffle of the variable-opening-degree sliding gas-liquid separation shaft rod and the pulley of the variable-opening-degree sliding gas-liquid separation shaft rod are arranged in an inner wall slide rail of the expandable gas-liquid separation chamber; the inner wall slide rail of the expandable gas-liquid separation chamber is arranged in the outer shell wall of the expandable gas-liquid separation chamber; the baffle of the variable-opening-degree sliding gas-liquid separation shaft rod is symmetrically arranged with respect to the pulley of the variable-opening-degree sliding gas-liquid separation shaft rod;

the triangular concave-convex impeller is provided with the peripheral slide rail, the magnetic bump, the magnetic pit, and a drive shaft rod of the expandable gas-liquid separation chamber; and the peripheral slide rail surrounds the impeller, and the drive shaft rod of the expandable gas-liquid separation chamber is coaxial with the A-side gas drive disks, and drives the triangular concave-convex impeller to rotate counterclockwise.

Further, two built-in water inlets are symmetrically arranged with respect to the one-way slide valve; and two second rotary spiral gas-liquid separation devices are symmetrically arranged with respect to a center of the expandable gas-liquid separation chamber, and each form an angle of 60° with the magnetic telescopic shaft rod.

Further, three outer chamber wall constriction/expansion devices are symmetrically arranged with respect to the outer shell wall of the expandable gas-liquid separation chamber, and every two adjacent outer chamber wall constriction/expansion devices form an angle of 120°; three inner chamber wall constriction/expansion devices are evenly arranged on the inner shell wall of the expandable gas-liquid separation chamber, and every two adjacent inner chamber wall constriction/expansion devices form an angle of 120°; and three eighth springs are evenly arranged.

The present disclosure has the following beneficial effects.

1. The present disclosure adopts an air-driven device. Different from conventional devices which are driven by electric power, in this device, high-speed gas is used at the top and bottom to drive the drive disks to rotate, and the rotation of the drive disks drives the drive shafts to rotate, further driving the drive shafts of the chamber on the corresponding sides to rotate. In addition, the high-speed gas from the driving device is utilized in combination with the vent valves arranged in the gas acceleration channel and the gas-liquid flow channel, and having the effect of allowing only gas to pass through and not allowing liquid to pass through, thereby reducing unnecessary liquid outflow. Air can be discharged more quickly from the two chambers, and the two chambers can be filled with water more quickly, thereby significantly improving the operating efficiency and greatly simplifying the operation process.

2. The present disclosure adopts the gas-liquid separation chamber, which is equipped with outer-chamber and inner-chamber gas-liquid separation devices. In the outer chamber, the fixed spiral gas-liquid separation device and the first rotary spiral gas-liquid separation device are used to realize gas-liquid separation in the outer chamber. At the same time, a small part of gas and liquid can flow into the inner chamber through these devices. In the inner chamber, through the rotation of the drive shafts, the ball of the telescopic piston shaft rod switches back and forth between the pit and the bump of the hexagonal concave-convex impeller, to realize periodic telescoping of the telescopic piston shaft rod to pump the gas and liquid in the outer chamber to the inner chamber. At the same time, the gas-liquid separation function of the device is adopted to realize gas-liquid separation in the inner chamber, thereby reducing the gas content in water, and reducing the probability of subsequent pump cavitation.

3. The present disclosure adopts the magnetic telescopic shaft rod and the triangular concave-convex impeller, and the pit and bump of the triangular concave-convex impeller to repel and attract the magnetic telescopic shaft rod respectively. The drive shaft of the triangular concave-convex impeller rotates to realize the periodic expansion and shrinkage of the volumes of the inner chamber and the outer chamber, to cause a periodic pressure change in the chambers. Through the one-way slide valve which periodically slides up and down at the water inlet, the built-in water inlet of the valve and the built-in impeller of the one-way slide valve, the gas-liquid separation at the water inlet is realized.

4. The present disclosure adopts the expandable gas-liquid separation chamber, which is equipped with outer-chamber and inner-chamber gas-liquid separation devices. In the outer chamber, the second rotary spiral gas-liquid separation device and the built-in spring of the magnetic telescopic shaft rod are used to realize gas-liquid separation. In the inner chamber, through the pressure change caused by the volume change, the degree of opening of the variable-opening-degree sliding gas-liquid separation shaft rod is periodically changed to better cooperate with the built-in impeller and the expandable flow channel to realize the gas-liquid separation of the outer, middle and inner layers of the inner chamber, thereby fully reducing the gas content in water.

Figure 1:
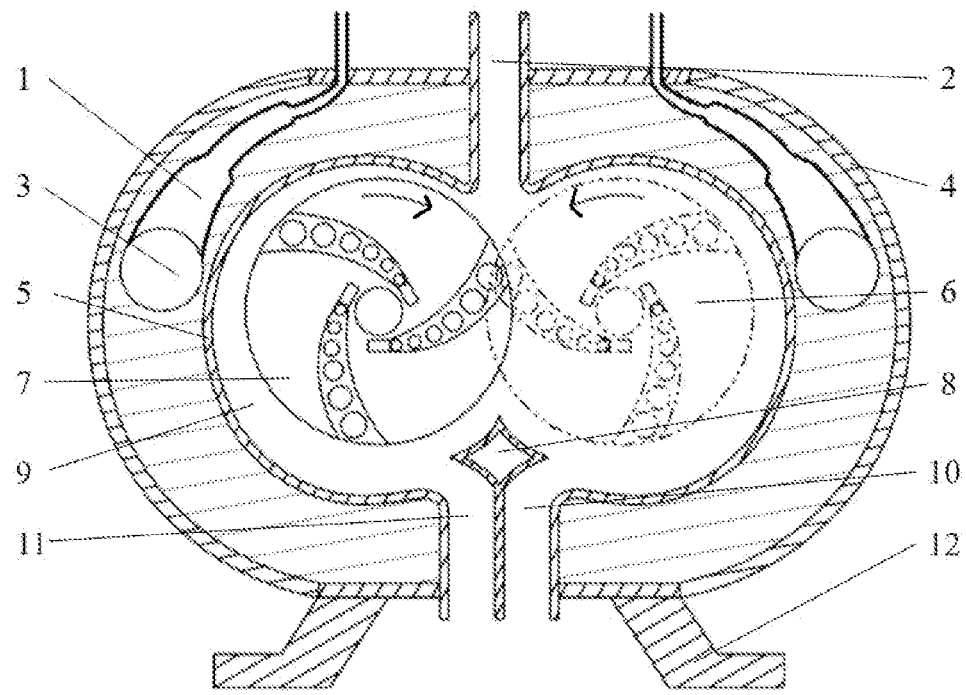
FIG. 1 is a schematic structural view of a driving device according to the present disclosure.

1—gas acceleration channel; 2—top gas inlet; 3—inlet of gas acceleration channel; 4—outer shell wall of driving device; 5—inner shell wall of driving device; 6—A-side gas drive disk;

7—B-side gas drive disk; 71—gas flow channel; 72—gas pore; 73—gas outlet; 74—drive shaft;

8—rhombic splitting device; 9—tapered gas flow channel; 10—bottom A-side gas inlet; 11—bottom B-side gas inlet; 12—fixing support; 13—outlet of gas acceleration channel;

14—vent valve; 141—spire; 142—embedded movable block; 143—wing-shaped structure; 144—fixing support of vent valve; 145—telescopic shaft rod of vent valve; 146—baffle of vent valve; 147—pulley of vent valve; 148—vent baffle; 149—solid block; 1410—slide rail of vent valve;

15—gas-liquid flow channel;

16—one-way valve; 161—first rotating shaft; 162—first spring; 163—first baffle; 17—gas-liquid separation chamber; 18—expandable gas-liquid separation chamber; 19—driving device; 20—water inlet of gas-liquid separation chamber;

21—fixed spiral gas-liquid separation device; 211—second rotating shaft; 212—second baffle; 213—second spring; 214—first spiral blade; 215—first rotary disc; 216—impeller of fixed spiral gas-liquid separation device; 217—rotating body;

22—outer shell wall of gas-liquid separation chamber;

23—first rotary spiral gas-liquid separation device; 231—second rotary disc; —second spiral blade; 233—impeller of first rotary spiral gas-liquid separation device;

24—inner shell wall of gas-liquid separation chamber;

25—hexagonal concave-convex impeller; 251—outer telescopic slide rail; 252—shaft bead; 253—shaft bead slide rail; 254—external drive shaft of gas-liquid separation chamber; 255—telescopic shaft rod of hexagonal concave-convex impeller;

26—telescopic piston shaft rod; 261—ball of telescopic piston shaft rod; 262—fixed shaft rod; 263—movable shaft rod; 264—third spring; 265—first flow channel; 266—glass tube of telescopic piston shaft rod; 267—piston; 268—fourth spring; 269—impeller of telescopic piston shaft rod; 2610—second flow channel; 2611—piston baffle; 2612—fifth spring; 2613—third rotating shaft; 2614—third baffle;

27—water inlet of expandable gas-liquid separation chamber;

28—one-way slide valve; 281—hollow sliding plate; 282—upper fixing block; 283—upper baffle; 284—primary slide rail; 285—sixth spring; 286—lower baffle; 287—secondary slide rail; 288—built-in water inlet; 289—built-in impeller of one-way slide valve; 2810—lower fixing block;

29—outer chamber wall constriction/expansion device; 291—glass tube of outer chamber wall constriction/expansion device; 292—piston of outer chamber wall constriction/expansion device; 293—seventh spring;

30—second rotary spiral gas-liquid separation device; 301—third rotary disc; 302—third spiral blade; 303—impeller of second rotary spiral gas-liquid separation device;

31—magnetic telescopic shaft rod; 311—eighth spring; 312—magnetic sliding shaft rod; 313—built-in slide rail; 314—baffle of magnetic telescopic shaft rod; 315—pulley of magnetic telescopic shaft rod; 316—magnetic fixed shaft rod;

32—outer shell wall of expandable gas-liquid separation chamber; 33—inner wall slide rail of expandable gas-liquid separation chamber;

34—inner chamber wall constriction/expansion device; 341—piston of inner chamber wall constriction/expansion device; 342—ninth spring; 343—glass tube of inner chamber wall constriction/expansion device;

35—triangular concave-convex impeller; 351—peripheral slide rail; 352—magnetic bump; 353—magnetic pit; 354—drive shaft rod of expandable gas-liquid separation chamber;

36—variable-opening-degree sliding gas-liquid separation shaft rod; 361—primary ball; 362—connecting shaft; 363—secondary ball; 364—constriction/expansion shaft rod; 365—built-in impeller of constriction/expansion shaft rod; 366—tenth spring; 367—expandable flow channel; 368—slide block; 369—baffle of variable-opening-degree sliding gas-liquid separation shaft rod; 3610—pulley of variable-opening-degree sliding gas-liquid separation shaft rod; 3611—fourth rotating shaft; 3612—eleventh spring; 3613—fourth baffle;

37—inner shell wall of expandable gas-liquid separation chamber.

DETAILED DESCRIPTION OF THE EMBODIMENTS

The present disclosure will be further described in detail below with reference to drawings and embodiments, but the protection scope of the present disclosure is not limited thereto.

As shown in FIG. 1, FIG. 3, FIG. 6 and FIG. 12, the present disclosure provides a pneumatic type water-free starting self-priming device. The device is of a symmetrical cylinder structure, including a driving device 19, a gas-liquid separation chamber 17, and an expandable gas-liquid separation chamber 18. The gas-liquid separation chamber 17 and the expandable gas-liquid separation chamber 18 are respectively arranged on two sides of the driving device 19, and gas acceleration channels 1 are symmetrically arranged on the two sides of the driving device 19. An inner chamber of the gas-liquid separation chamber 17 and an inner chamber of the expandable gas-liquid separation chamber 18 are each connected to an outlet 13 of a corresponding gas acceleration channel through a corresponding gas-liquid flow channel 15. A vent valve 14 is arranged at the connection between the outlet 13 of the gas acceleration channel and the gas-liquid flow channel 15. One-way valves 16 are arranged at an interface between the inner chamber of the gas-liquid separation chamber 17 and the corresponding gas-liquid flow channel 15 and at an interface between the inner chamber of the expandable gas-liquid separation chamber 18 and the corresponding gas-liquid flow channel 15. The one-way valves 16 are arranged symmetrically about a chamber central axis.

Drive shafts on the two sides of the driving device 19 are respectively connected to drive shafts of the gas-liquid separation chamber 17 and the expandable gas-liquid separation chamber 18. The drive shafts on the two sides do not interfere with each other. The driving device 19 uses high-speed gas to drive a drive disk to rotate, to drive the drive shafts to rotate.

A telescopic piston shaft rod 26 in the gas-liquid separation chamber 17 is used to generate a pressure difference between the chamber and outside to suck in water, so as to realize water suction, gas-liquid separation and water drainage.

The expandable gas-liquid separation chamber 18 uses the shrinkage or expansion of volumes of inner and outer chambers thereof to generate a pressure difference to suck in water, so as to realize water suction, gas-liquid separation, and water drainage.

A fixing support 12 is arranged at a bottom of the driving device 19, the gas-liquid separation chamber 17 and the expandable gas-liquid separation chamber 18.

Figure 2:
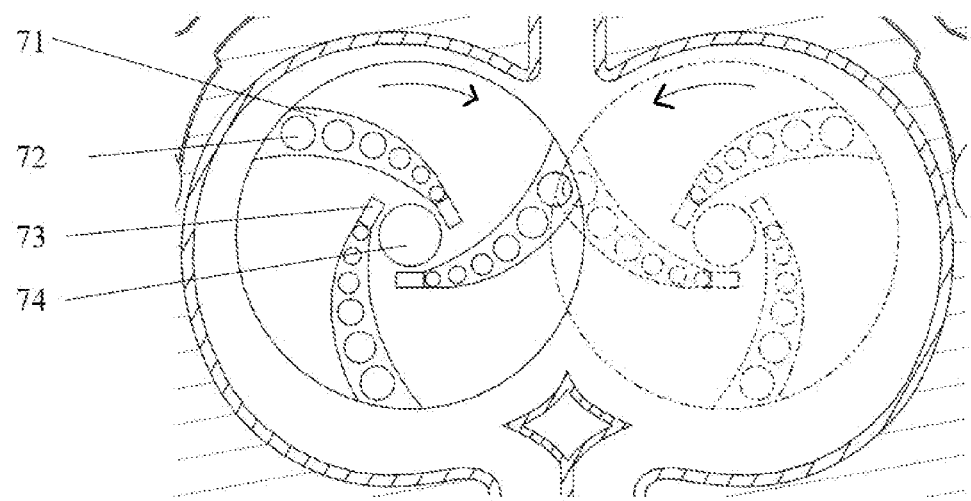
FIG. 2 is an enlarged structural diagram of gas drive disks on two sides.

As shown in FIG. 1 and FIG. 2, the driving device 19 includes, in sequence from outside to inside, an outer shell wall 4 of the driving device, a top gas inlet 2, inlets 3 of the gas acceleration channels, the gas acceleration channels 1, an inner shell wall 5 of the driving device, a tapered gas flow channel 9, an A-side gas drive disk 6, a B-side gas drive disk 7, a rhombic splitting device 8, a bottom B-side gas inlet 11, and a bottom A-side gas inlet 10.

The top gas inlet 2 runs through the outer shell wall 4 of the driving device and the inner shell wall 5 of the driving device and is communicated with a top of the tapered gas flow channel 9. The bottom A-side gas inlet 10 is provided on one side of the A-side gas drive disk 6, runs through the outer shell wall 4 of the driving device and the inner shell wall 5 of the driving device, and is communicated with a bottom of the tapered gas flow channel 9. The bottom B-side gas inlet 11 is provided on one side of the B-side gas drive disk 7, runs through the outer shell wall 4 of the driving device and the inner shell wall 5 of the driving device, and is communicated with the bottom of the tapered gas flow channel 9. The rhombic splitting device 8 is arranged at the bottom of the tapered gas flow channel 9 to split air intake at the bottom into an A side and a B side.

The inlets 3 of the gas acceleration channels are respectively communicated with the gas acceleration channels 1 and are symmetrically arranged on the two sides of the driving device 19. The gas acceleration channels 1 are tapered from bottom to top.

The tapered gas flow channel 9 is symmetrically arranged and is tapered from bottom to top.

Figure 3:
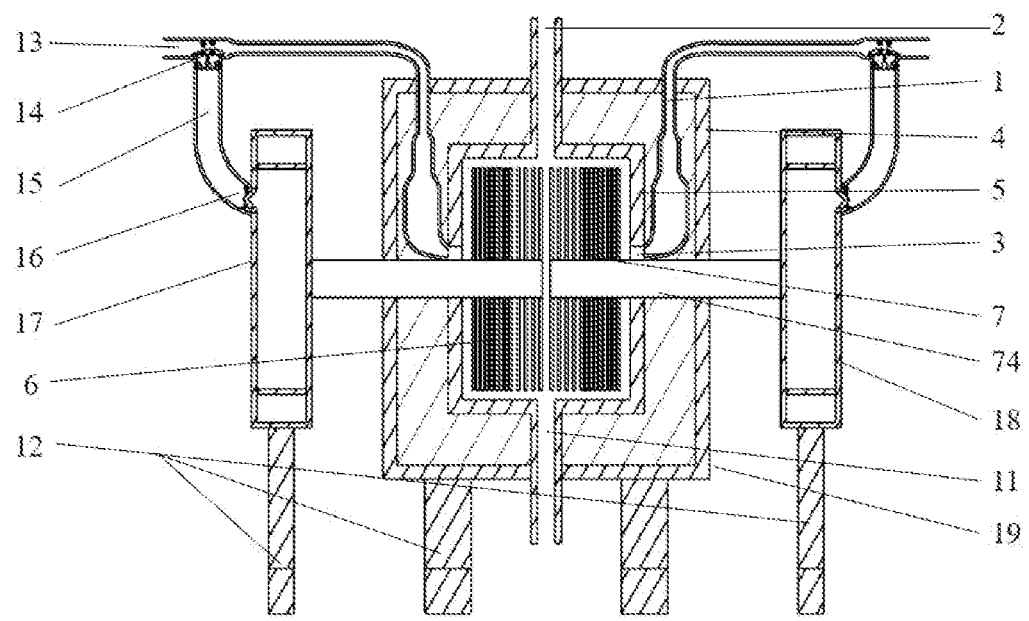
FIG. 3 is a structural side view of a pneumatic type water-free starting self-priming device according to the present disclosure.

As shown in FIG. 3, a plurality of B-side gas drive disks 7 are arranged on a drive shaft 74 on the B side. In a gas inlet to outlet direction, a density of drive disks increases, and a dense point is close to the inlet 3 of the gas acceleration channel. As shown in FIG. 2, a plurality of gas flow channels 71 and gas outlets 73 corresponding to the gas flow channels 71 are arranged on each of the B-side gas drive disks 7, a plurality of gas pores 72 are provided on each of the gas flow channels 71, and pore sizes of the gas pores 72 decrease in a proportion along the gas outlet 73 of the gas flow channel 71.

The B-side gas drive disks 7 rotate clockwise under the action of the top gas inlet 2 and the bottom B-side gas inlet 11. The A-side gas drive disk 6 is of the same structure as the B-side gas drive disk 7. The A-side gas drive disk 6 and the B-side gas drive disk 7 are arranged on two sides of the top gas inlet 2. The A-side gas drive disk 6 rotates counterclockwise under the action of the top gas inlet 2 and the bottom A-side gas inlet 10. The A-side gas drive disk 6 and the B-side gas drive disk 7 do not interfere with each other during rotation.

Optionally, the gas acceleration channel 1 includes a first segment, a second segment and a third segment in sequence, where a radius of the second segment is 0.5 times a radius of the first segment, and a radius of the third segment is 0.5 times the radius of the second segment. The tapered gas flow channel 9 is tapered from bottom to top, and a radius of the bottom of the tapered gas flow channel 9 is 5 times a radius of a top of the tapered gas flow channel 9. Three gas flow channels 71 are arranged on the B-side gas drive disk 7, and every two adjacent gas flow channels 71 form an angle of 120°. The gas pores 72 are circular, and radii of the gas pores 72 decrease to 0.8 times for several times toward the gas outlet 73. The gas outlet 73 is rectangular.

Figure 5:
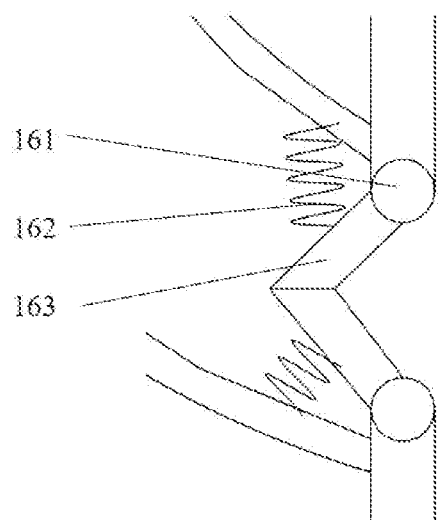
FIG. 5 is an enlarged structural diagram of a one-way valve.

As shown in FIG. 5, the one-way valve 16 includes a first rotating shaft 161, a first spring 162 and a first baffle 163. Two sides of the first spring 162 are respectively connected to a wall surface of the gas-liquid flow channel 15 and the first baffle 163.

Figure 4:
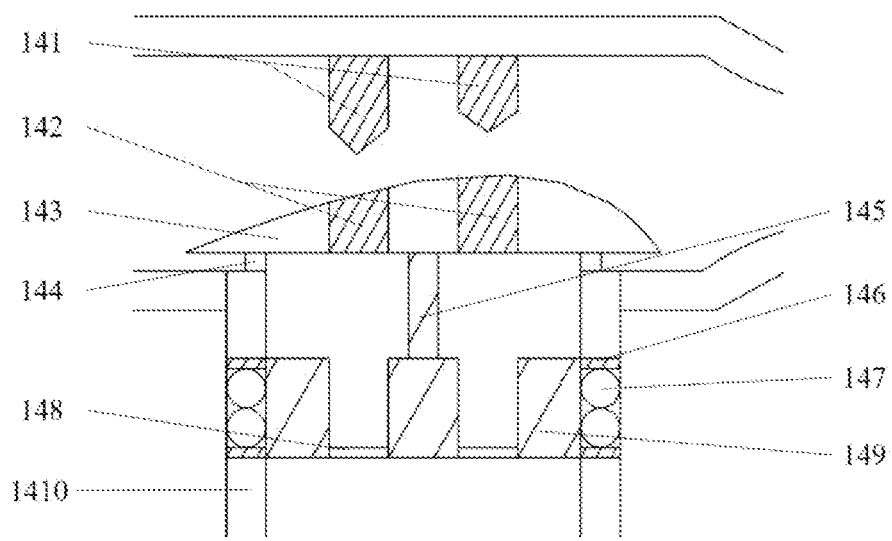
FIG. 4 is an enlarged structural diagram of a vent valve.

As shown in FIG. 4, the vent valve 14 includes a spire 141, an embedded movable block 142, a wing-shaped structure 143, a fixing support 144 of the vent valve, a telescopic shaft rod 145 of the vent valve, a baffle 146 of the vent valve, a pulley 147 of the vent valve, a vent baffle 148, a solid block 149 and a slide rail 1410 of the vent valve. The spire 141 is arranged on a wall surface of the gas acceleration channel 1 and at a position corresponding to a position of the embedded movable block 142. The embedded movable block 142 is arranged in the wing-shaped structure 143. A number of spires 141 and a number of embedded movable blocks 142 are both 2. The wing-shaped structure 143 is initially arranged at the fixing support 144 of the vent valve. The telescopic shaft rod 145 of the vent valve is connected to the wing-shaped structure 143 and the vent baffle 148. The vent baffle 148 is connected to the solid block 149. The solid block 149 is connected to the baffle 146 of the vent valve and the pulley 147 of the vent valve. The baffle 146 of the vent valve is vertically symmetrically arranged with respect to the pulley 147 of the vent valve. The pulley 147 of the vent valve operates in the slide rail 1410 of the vent valve. The slide rail 1410 of the vent valve is arranged in the wall surface of the gas-liquid flow channel 15.

Figure 6:
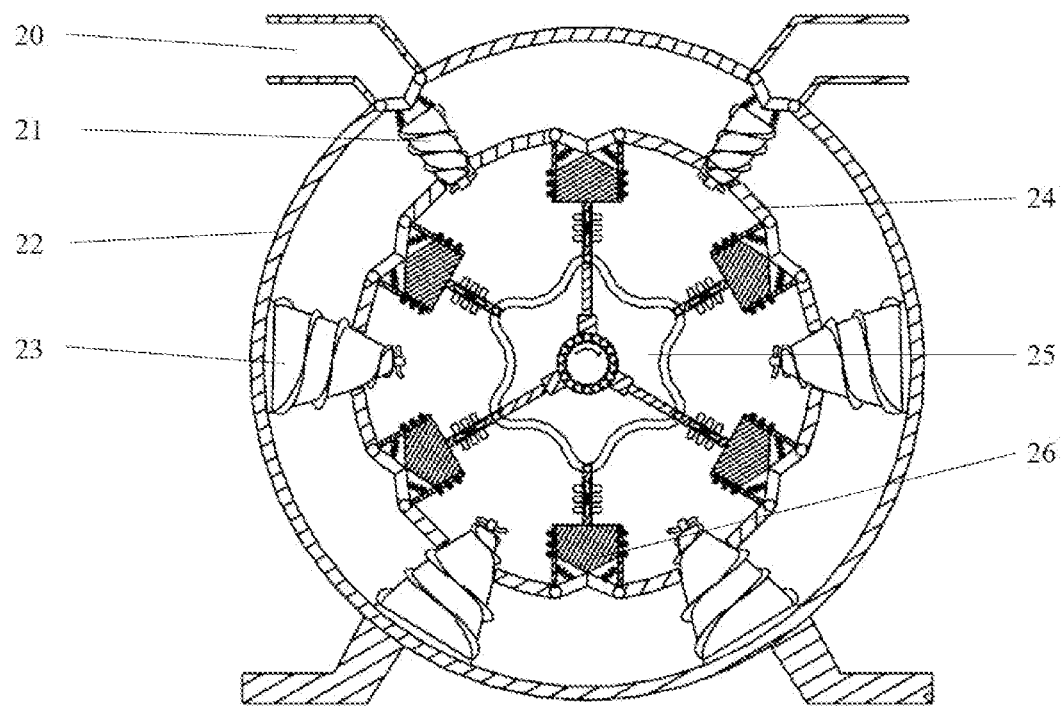
FIG. 6 is a schematic structural diagram of a gas-liquid separation chamber in a pneumatic type water-free starting self-priming device according to the present disclosure.

As shown in FIG. 6, the gas-liquid separation chamber 17 includes, in sequence from outside to inside, water inlets 20 of the gas-liquid separation chamber, an outer shell wall 22 of the gas-liquid separation chamber, spiral gas-liquid separation devices, an inner shell wall 24 of the gas-liquid separation chamber, the telescopic piston shaft rod 26 and a hexagonal concave-convex impeller 25.

Figure 7:
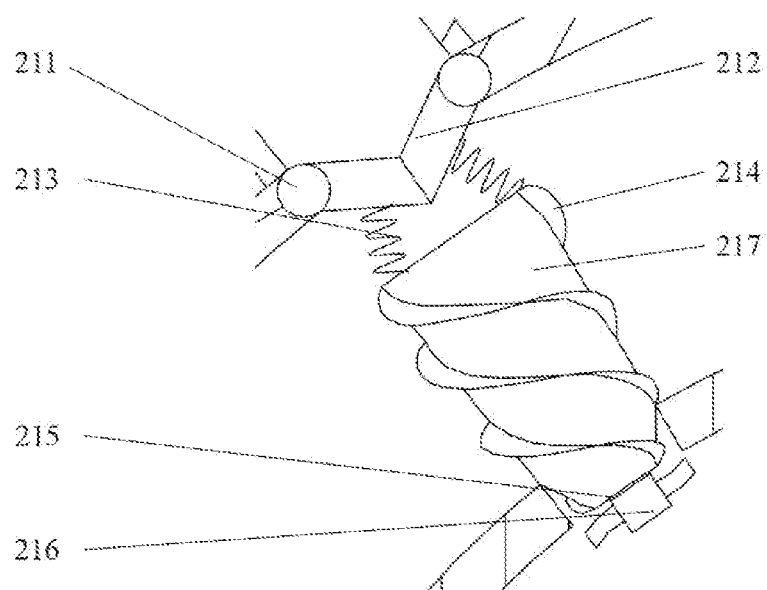
FIG. 7 is an enlarged structural diagram of a fixed spiral gas-liquid separation device.
Figure 8:
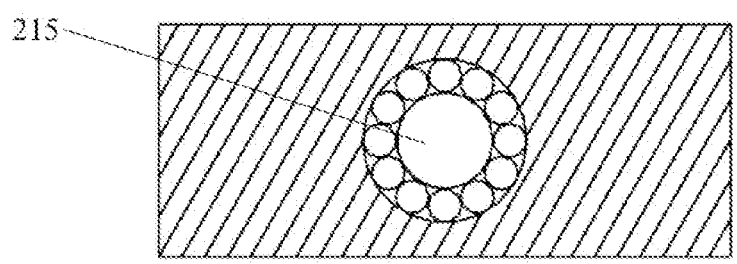
FIG. 8 is a schematic structural diagram of a first rotary disc.

The spiral gas-liquid separation device includes fixed spiral gas-liquid separation devices 21 and first rotary spiral gas-liquid separation devices 23. The fixed spiral gas-liquid separation devices 21 are arranged at the inlets on the two sides, penetrate the inner shell wall 24 of the gas-liquid separation chamber, and each include a second rotating shaft 211, a second baffle 212, a second spring 213, a first spiral blade 214, a first rotary disc 215, an impeller 216 of the fixed spiral gas-liquid separation device and a rotating body 217. As shown in FIG. 7, the second rotating shaft 211 is connected to the outer shell wall 22 of the gas-liquid separation chamber and the second baffle 212. The second spring 213 is connected to the second baffle 212 and the rotating body 217. The first rotary disc 215 is connected to the rotating body 217 and the impeller 216 of the fixed spiral gas-liquid separation device. The first rotary disc 215 is configured for rotating the impeller 216 of the fixed spiral gas-liquid separation device. A plurality of first spiral blades 214 are arranged on a surface of the rotating body 217. The structure of the first rotary disc 215 is shown in FIG. 8.

Figure 9:
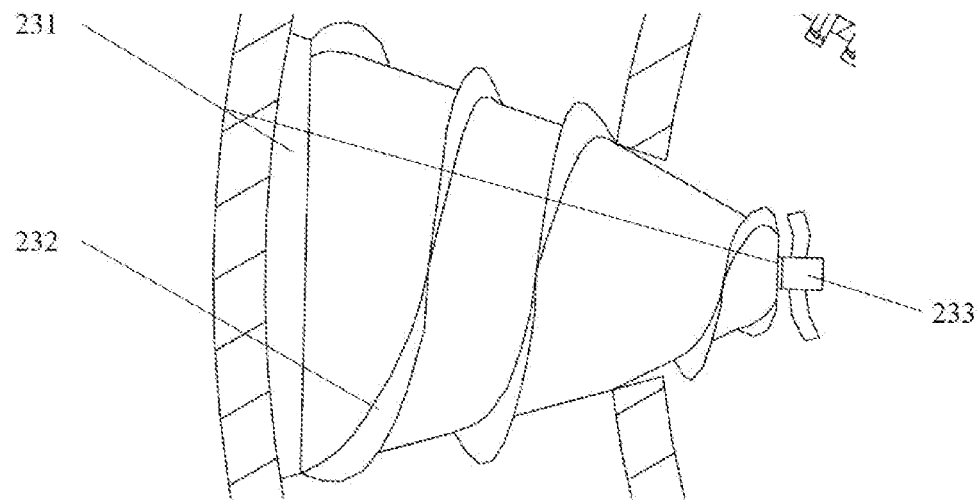
FIG. 9 is an enlarged structural diagram of a first rotary spiral gas-liquid separation device.

The first rotary spiral gas-liquid separation device 23 penetrates the inner shell wall 24 of the gas-liquid separation chamber, and a plurality of the first rotary spiral gas-liquid separation devices 23 are arranged, each including a second rotary disc 231, a second spiral blade 232 and an impeller 233 of the first rotary spiral gas-liquid separation device. As shown in FIG. 9, the second rotary disc 231 is of the same structure as the first rotary disc 215, and is configured for rotating the first rotary spiral gas-liquid separation device 23 and the impeller 233 of the first rotary spiral gas-liquid separation device. A plurality of second spiral blades 232 are arranged on a surface of the first rotary spiral gas-liquid separation device 23.

Figure 10:
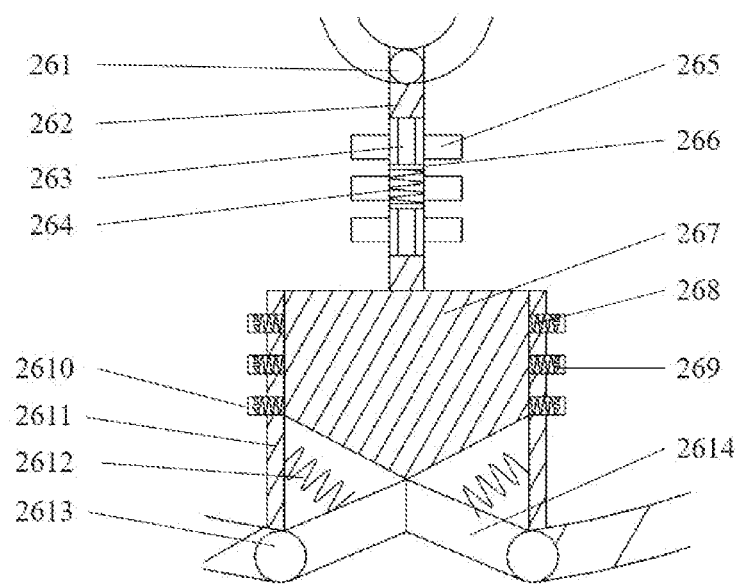
FIG. 10 is an enlarged structural diagram of a telescopic piston shaft rod.

A plurality of telescopic piston shaft rods 26 are arranged, as shown in FIG. 10, each including a ball 261 of the telescopic piston shaft rod, a fixed shaft rod 262, a movable shaft rod 263, a third spring 264, a first flow channel 265, a glass tube 266 of the telescopic piston shaft rod, a piston 267, a fourth spring 268, an impeller 269 of the telescopic piston shaft rod, a second flow channel 2610, a piston baffle 2611, a fifth spring 2612, a third rotating shaft 2613 and a third baffle 2614. The ball 261 of the telescopic piston shaft rod is arranged in the outer telescopic slide rail 251 and is connected to one end of the fixed shaft rod 262. The movable shaft rod 263 is connected to the fixed shaft rod 262, is symmetrically arranged with respect to the third spring 264, and is arranged in the glass tube 266 of the telescopic piston shaft rod together with the third spring 264. The first flow channel 265 is arranged outside the glass tube 266 of the telescopic piston shaft rod, and a plurality of first flow channels 265 are symmetrically arranged with respect to a central line of the fixed shaft rod 262. The piston 267 is connected to an other end of the fixed shaft rod 262, and the piston baffle 2611 is arranged on each of two sides of the piston 267. A plurality of second flow channels 2610 are arranged on each of the piston baffles 2611 on the two sides. The fourth spring 268 and the impeller 269 of the telescopic piston shaft rod are arranged in the second flow channel 2610. The fifth spring 2612 is connected to the piston baffle 2611 and the third baffle 2614. The third rotating shaft 2613 is connected to the third baffle 2614 and the inner shell wall 24 of the gas-liquid separation chamber. The fifth springs 2612, the third rotating shafts 2613 and the third baffles 2614 are symmetrically arranged with respect to a center of the telescopic piston shaft rod 26.

Figure 11:
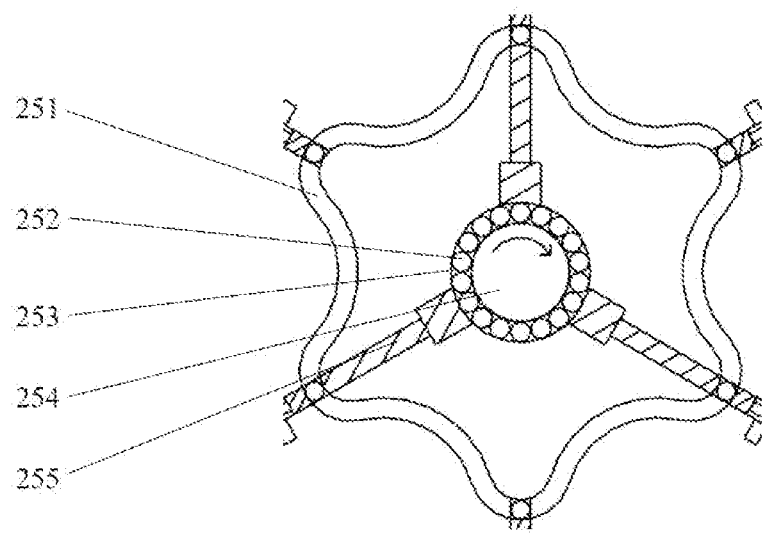
FIG. 11 is an enlarged structural diagram of a hexagonal concave-convex impeller.

As shown in FIG. 11, the hexagonal concave-convex impeller 25 is provided with an outer telescopic slide rail 251, shaft beads 252, a shaft bead slide rail 253, an external drive shaft 254 of the gas-liquid separation chamber and a telescopic shaft rod 255 of the hexagonal concave-convex impeller. The outer telescopic slide rail 251 surrounds the impeller and has a telescopic effect. The shaft beads 252 are arranged in the shaft bead slide rail 253, and surround the shaft bead slide rail 253. The external drive shaft 254 of the gas-liquid separation chamber is coaxial with the B-side gas drive disk 7, and drives the hexagonal concave-convex impeller 25 to rotate clockwise. A plurality of telescopic shaft rods 255 of the hexagonal concave-convex impeller are arranged in the hexagonal concave-convex impeller 25, and each have one end integrally welded to the shaft bead slide rail 253 and an other end connected to the ball 261 of the telescopic piston shaft rod.

Optionally, two first spiral blades 214 are arranged; two second spiral blades 232 are arranged; three telescopic shaft rods 255 of the hexagonal concave-convex impeller are arranged, and every two adjacent telescopic shaft rods 255 form an angle of 120°; six first flow channels 265 are evenly arranged, with three first flow channels 265 being arranged on each side; and six second flow channels are evenly arranged, with three second flow channels being arranged on each side.

Optionally, four first rotary spiral gas-liquid separation devices 23 are symmetrically arranged with respect to the gas-liquid separation chamber, and every two first rotary spiral gas-liquid separation devices 23 are spaced apart by 60°; the first rotary spiral gas-liquid separation device 23 is spaced apart from the fixed spiral gas-liquid separation device 21 by 60°; and six telescopic piston shaft rods 26 are symmetrically arranged with respect to the gas-liquid separation chamber, and every two adjacent telescopic piston shaft rods 26 are spaced apart by 60°.

Figure 12:
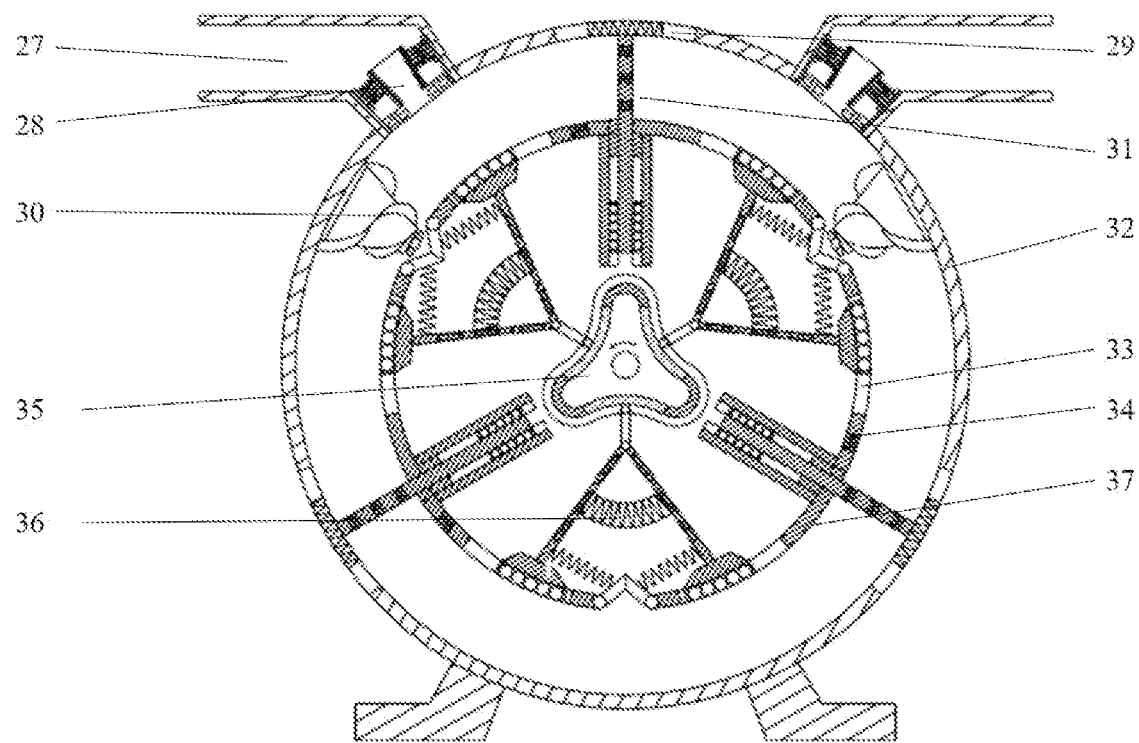
FIG. 12 is a schematic structural diagram of an expandable gas-liquid separation chamber in a pneumatic type water-free starting self-priming device according to the present disclosure.

As shown in FIG. 12, the expandable gas-liquid separation chamber 18 includes, in sequence from outside to inside, a water inlet 27 of the expandable gas-liquid separation chamber, a one-way slide valve 28, an outer shell wall 32 of the expandable gas-liquid separation chamber, a second rotary spiral gas-liquid separation device 30, an inner shell wall 37 of the expandable gas-liquid separation chamber, a variable-opening-degree sliding gas-liquid separation shaft rod 36 and a triangular concave-convex impeller 35.

Figure 13:
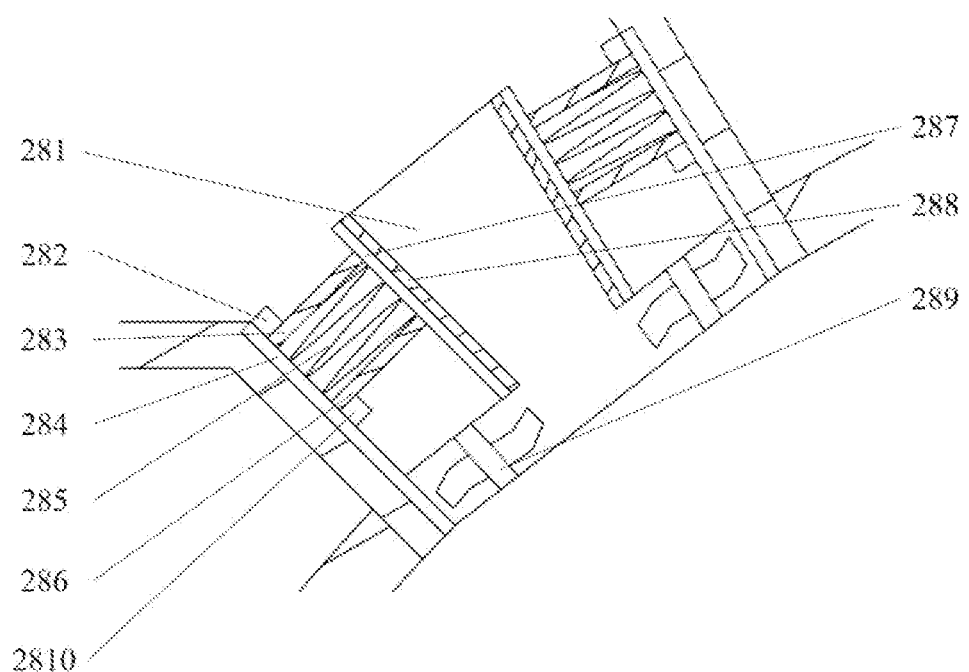
FIG. 13 is an enlarged structural diagram of a one-way slide valve.

As shown in FIG. 13, the one-way slide valve 28 is arranged in the water inlet 27 of the expandable gas-liquid separation chamber, is of a symmetrical structure, and includes a hollow sliding plate 281, an upper fixing block 282, an upper baffle 283, a primary slide rail 284, a sixth spring 285, a lower baffle 286, a secondary slide rail 287, a built-in water inlet 288, a built-in impeller 289 of the one-way slide valve and a lower fixing block 2810. The hollow sliding plate 281 is hollow inside, and is connected to the secondary slide rail 287. A water flow enters a flow channel inside the hollow sliding plate 281 through the built-in water inlet 288. A plurality of built-in water inlets 288 are arranged. The upper baffle 283 and the lower baffle 286 are connected to the primary slide rail 284 and the secondary slide rail 287. The upper fixing block 282 limits a movement of the upper baffle 283 toward a top of the hollow sliding plate 281. The lower fixing block 2810 limits a movement of the lower baffle 286 toward a bottom of the hollow sliding plate 281. The sixth spring 285 is arranged between the upper baffle 283 and the lower baffle 286. The primary slide rail 284 is arranged on a wall surface of the water inlet 27 of the expandable gas-liquid separation chamber. The built-in impeller 289 of the one-way slide valve is arranged inside the hollow sliding plate 281, and allows a corresponding bottom water flow to pass therethrough.

Figure 14:
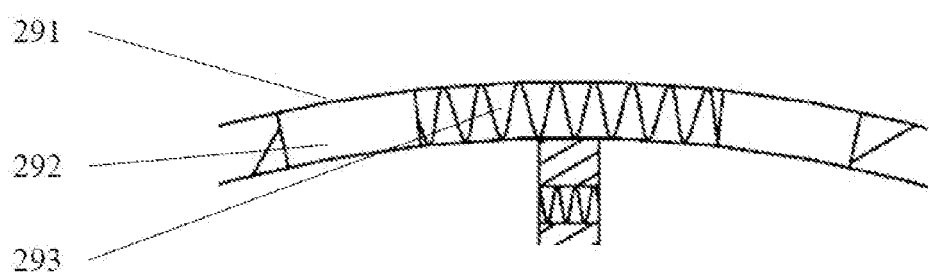
FIG. 14 is an enlarged structural diagram of an outer chamber wall constriction/expansion device.

As shown in FIG. 14, a plurality of outer chamber wall constriction/expansion devices 29 are arranged at the outer shell wall 32 of the expandable gas-liquid separation chamber, and each include a glass tube 291 of the outer chamber wall constriction/expansion device, a piston 292 of the outer chamber wall constriction/expansion device and a seventh spring 293. The piston 292 of the outer chamber wall constriction/expansion device is symmetrically arranged with respect to the seventh spring 293. The piston 292 and the seventh spring 293 of the outer chamber wall constriction/expansion device are both arranged inside the glass tube 291 of the outer chamber wall constriction/expansion device.

Figure 15:
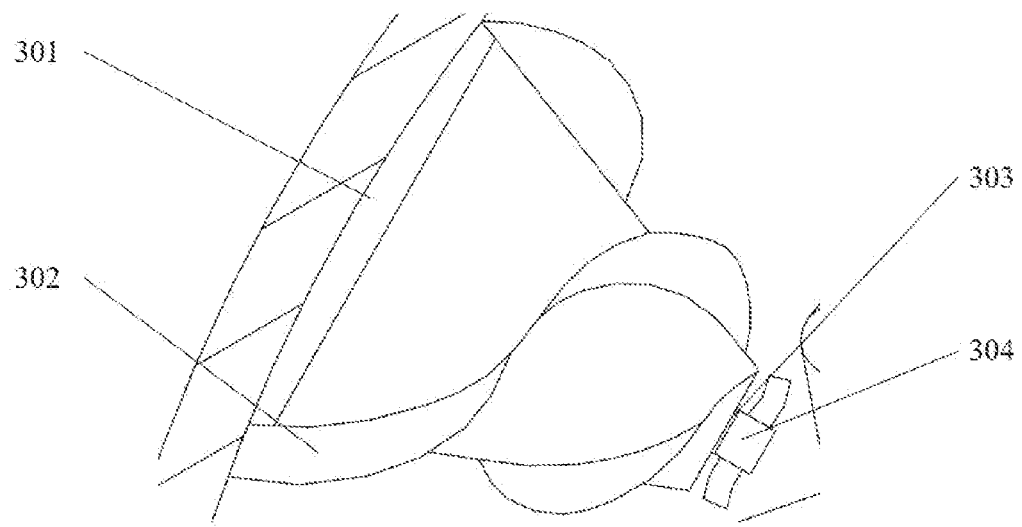
FIG. 15 is an enlarged structural diagram of a second rotary spiral gas-liquid separation device.

As shown in FIG. 15, the second rotary spiral gas-liquid separation device 30 is of the same structure as the first rotary spiral gas-liquid separation device 23, and a plurality of second rotary spiral gas-liquid separation devices 30 are arranged.

Figure 16:
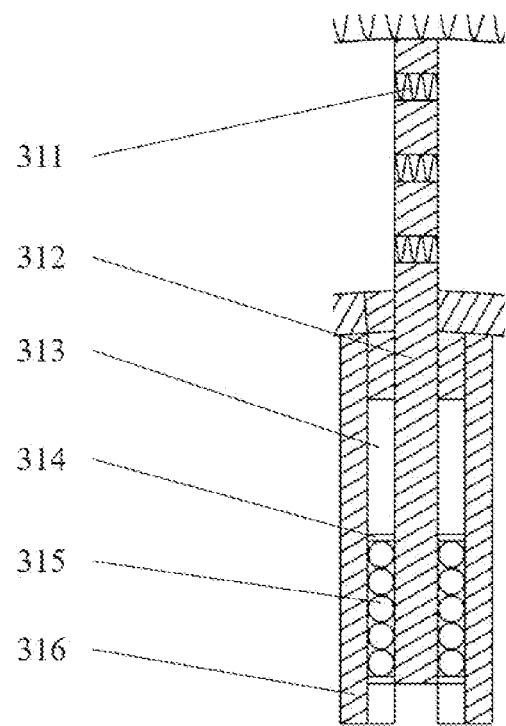
FIG. 16 is an enlarged structural diagram of a magnetic telescopic shaft rod.

As shown in FIG. 16, three magnetic telescopic shaft rods 31 are symmetrically arranged with respect to the expandable gas-liquid separation chamber 18, every two adjacent magnetic telescopic shaft rods 31 are spaced apart by 120°, and each of the magnetic telescopic shaft rods 31 includes an eighth spring 311, a magnetic sliding shaft rod 312, a built-in slide rail 313, a baffle 314 of the magnetic telescopic shaft rod, a pulley 315 of the magnetic telescopic shaft rod and a magnetic fixed shaft rod 316. A plurality of eighth springs 311 are arranged inside the magnetic sliding shaft rod 312, and are in an outer chamber section of the expandable gas-liquid separation chamber 18. Magnetism of the magnetic sliding shaft rod 312 repels magnetism of the magnetic bump 352. The baffle 314 of the magnetic telescopic shaft rod and the pulley 315 of the magnetic telescopic shaft rod are arranged inside the built-in slide rail 313. The built-in slide rail 313 is connected to the magnetic sliding shaft rod 312 and the magnetic fixed shaft rod 316. Magnetism of the magnetic fixed shaft rod 316 attracts magnetism of the magnetic pit 353. The magnetic sliding shaft rod 312 is connected to the outer shell wall 32 of the expandable gas-liquid separation chamber and penetrates the inner shell wall 37 of the expandable gas-liquid separation chamber. The magnetic fixed shaft rod 316 is connected to the inner shell wall 37 of the expandable gas-liquid separation chamber. The baffle 314 of the magnetic telescopic shaft rod is symmetrically arranged with respect to the pulley 315 of the magnetic telescopic shaft rod.

Figure 17:
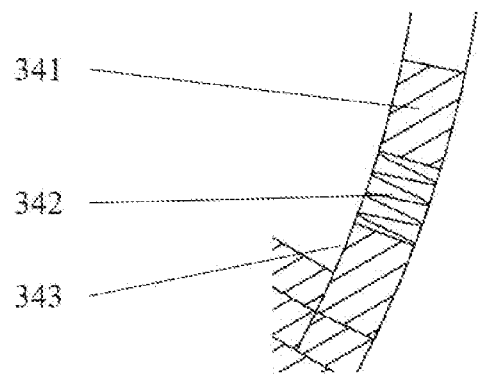
FIG. 17 is an enlarged structural diagram of an inner chamber wall constriction/expansion device.

As shown in FIG. 17, the inner chamber wall constriction/expansion device 34 is of the same structure as the outer chamber wall constriction/expansion device 29, and a plurality of inner chamber wall constriction/expansion devices 34 are arranged at the inner shell wall 37 of the expandable gas-liquid separation chamber.

Figure 18:
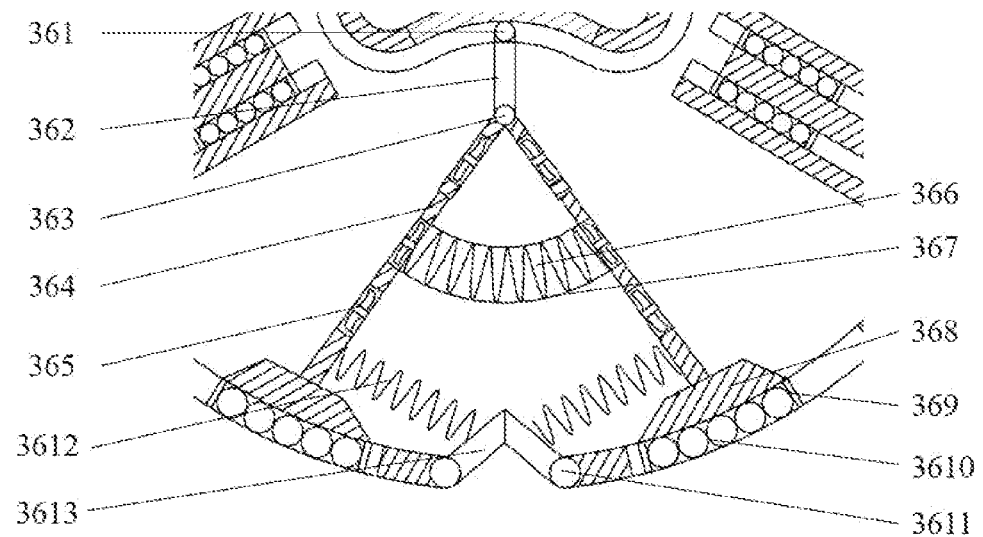
FIG. 18 is an enlarged structural diagram of a variable-opening-degree sliding gas-liquid separation shaft rod.

As shown in FIG. 18, the variable-opening-degree sliding gas-liquid separation shaft rod 36 is of a symmetrical structure, three variable-opening-degree sliding gas-liquid separation shaft rods 36 are arranged with respect to the expandable gas-liquid separation chamber, every two adjacent variable-opening-degree sliding gas-liquid separation shaft rods 36 form an angle of 120°, and each of the variable-opening-degree sliding gas-liquid separation shaft rods 36 includes a primary ball 361, a connecting shaft 362, a secondary ball 363, a constriction/expansion shaft rod 364, a built-in impeller 365 of the constriction/expansion shaft rod, a tenth spring 366, an expandable flow channel 367, a slide block 368, a baffle 369 of the variable-opening-degree sliding gas-liquid separation shaft rod, a pulley 3610 of the variable-opening-degree sliding gas-liquid separation shaft rod, a fourth rotating shaft 3611, an eleventh spring 3612 and a fourth baffle 3613. The primary ball 361 is movable in the peripheral slide rail 351, and is connected to the connecting shaft 362. The secondary ball 363 is connected to the constriction/expansion shaft rods 364 on the two sides, to change degrees of opening of the constriction/expansion shaft rods 364 on the two sides. A plurality of built-in impellers 365 of the constriction/expansion shaft rod are arranged in the constriction/expansion shaft rod 364. The tenth spring 366 is arranged in the expandable flow channel 367, and two ends of the tenth spring 366 are connected to the built-in impellers 365 of the constriction/expansion shaft rod on the two sides. The eleventh spring 3612 is connected to the constriction/expansion shaft rod 364 and the fourth baffle 3613. The fourth rotating shaft 3611 is connected to the inner shell wall 37 of the expandable gas-liquid separation chamber and the fourth baffle 3613. The slide block 368 is connected to the baffle 369 of the variable-opening-degree sliding gas-liquid separation shaft rod and the pulley 3610 of the variable-opening-degree sliding gas-liquid separation shaft rod. The baffle 369 of the variable-opening-degree sliding gas-liquid separation shaft rod and the pulley 3610 of the variable-opening-degree sliding gas-liquid separation shaft rod are arranged in the inner wall slide rail 33 of the expandable gas-liquid separation chamber. The inner wall slide rail 33 of the expandable gas-liquid separation chamber is arranged in the outer shell wall 32 of the expandable gas-liquid separation chamber. The baffle 369 of the variable-opening-degree sliding gas-liquid separation shaft rod is symmetrically arranged with respect to the pulley 3610 of the variable-opening-degree sliding gas-liquid separation shaft rod.

Figure 19:
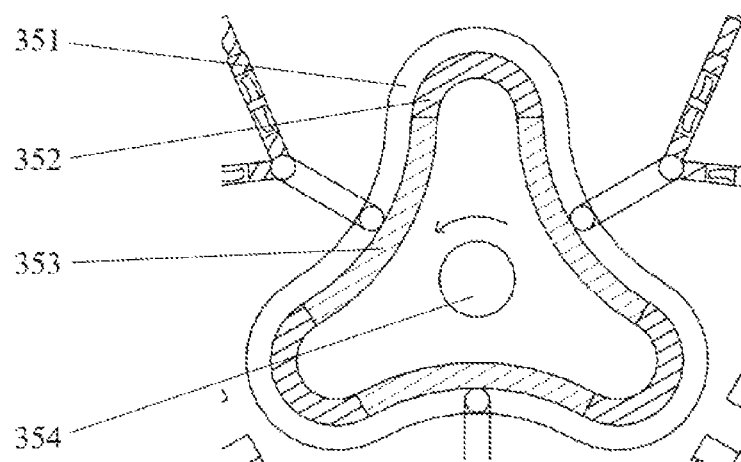
FIG. 19 is an enlarged structural diagram of a triangular concave-convex impeller. In the drawings.

As shown in FIG. 19, the triangular concave-convex impeller 35 is provided with a peripheral slide rail 351, a magnetic bump 352, a magnetic pit 353 and a drive shaft rod 354 of the expandable gas-liquid separation chamber. The peripheral slide rail 351 surrounds the impeller, and the drive shaft rod 354 of the expandable gas-liquid separation chamber is coaxial with the A-side gas drive disk 6, and drives the triangular concave-convex impeller 35 to rotate counterclockwise.

Optionally, two built-in water inlets 288 are symmetrically arranged with respect to the one-way slide valve 28; and two second rotary spiral gas-liquid separation devices 30 are symmetrically arranged with respect to a center of the expandable gas-liquid separation chamber, and each form an angle of 60° with the magnetic telescopic shaft rod 31.

Optionally, three outer chamber wall constriction/expansion devices 29 are symmetrically arranged with respect to the outer shell wall 32 of the expandable gas-liquid separation chamber, and every two adjacent outer chamber wall constriction/expansion devices 29 form an angle of 1200; three inner chamber wall constriction/expansion devices 34 are evenly arranged on the inner shell wall 37 of the expandable gas-liquid separation chamber, and every two adjacent inner chamber wall constriction/expansion devices 34 form an angle of 120°; and three eighth springs 311 are evenly arranged.

The operation process of the present disclosure is as follows.

Before the device is started, the ball of the telescopic piston shaft rod 261 is at the bump of the hexagonal concave-convex impeller 25, the magnetic telescopic shaft rod 31 is above the bump of the triangular concave-convex impeller 35, all the baffles are in a closed state, and all the springs are in an initial state. As the high-speed gas starts to enter from the top gas inlet 2, the outermost disk of the A-side gas drive disks 6 and the B-side gas drive disks 7 rotates. The high-speed gas continues to move downward and is split by the rhombic splitting device 8 into two parts, which respectively converge with high-speed gas entering from the bottom B-side gas inlet 11 and the bottom A-side gas inlet 10, to continue to drive the A-side gas drive disks 6 and the B-side gas drive disks 7. Due to the narrow tube effect of the tapered gas flow channel 9, the gas flow rate further increases, and the speed of the outermost disk increases. Under the action of the gas flow channel 71 and the gas pores 72, the outermost disk starts to rotate under the influence of the high-speed gas flow. Similarly, the disks adjacent to the outermost disk also start to rotate. As most of the disks start to rotate, the drive shafts on the two sides start to rotate, and the high-speed gas flows out through the gas outlet 73 corresponding to the drive disc, and enters the gas acceleration channel 1. Because the gas acceleration channel 1 is also tapered, the gas flow rate is increased in this process, and the high-speed gas will flow out from the outlet 13 of the gas acceleration channel to the atmosphere.

As the drive shaft on one side starts to rotate, the ball of telescopic piston shaft rod 261 of the gas-liquid separation chamber 17 moves from the bump to the pit of the hexagonal concave-convex impeller 25, and the outer telescopic slide rail 251 starts to retract under the action of the telescopic shaft rod 255 of the hexagonal concave-convex impeller. Under the action of the fixed shaft rod 262, the piston 267 moves outward significantly, the third baffle 2613 is opened, gas in the outer chamber starts to be pumped into the inner chamber through the second flow channel 2610, and the pressure in the inner chamber increases. In the process that the high-speed gas flows from the outlet 3 of the gas acceleration channel to the atmosphere, the wing-shaped structure 143 lifts up due to the uneven upper and lower pressure of its own structure. Due to the high gas flow rate, the pressure in the gas acceleration channel 1 is lower than that in the gas-liquid flow channel 15. Therefore, air in the gas-liquid flow channel 15 will be discharged with the high-speed gas, upon which the gas-liquid flow channel 15 enters a low-pressure state. As the pressure in the inner chamber increases, the first baffle 163 of the one-way valve 16 is immediately opened, gas in the inner chamber is discharged rapidly, and the first spring 162 is compressed. When the pressure difference is not enough to compress the first spring 162, the first baffle 163 is immediately closed, and gas enters from the outer chamber into the inner chamber. In this case, although the fixed spiral gas-liquid separation device 21 and the first rotary spiral gas-liquid separation device 23 penetrate the inner shell wall 24 of the gas-liquid separation chamber and a small amount of gas flows from the inner chamber into the outer chamber, the amount of gas is not enough to maintain a balance between the pressure of the inner chamber and the pressure of the outer chamber, and the outer chamber is still in the low-pressure state compared with the inner chamber. The second baffle 212 is opened, and water flows into the outer chamber. A part of water enters through the fixed spiral gas-liquid separation device 21, is subjected to the first layer of separation in the outer chamber by the impeller 216 of the fixed spiral gas-liquid separation device, and enters the inner chamber. Another part of water enters through the first rotary spiral gas-liquid separation device 23, and is subjected to the second layer of gas-liquid separation by the impeller 233 of the first rotary spiral gas-liquid separation device. The remaining water flow is located in the bottom layer of the outer chamber.

As the drive shaft on one side continues to rotate, the ball 261 of telescopic piston shaft rod in the gas-liquid separation chamber 17 moves from the pit to the bump to the hexagonal concave-convex impeller 25, the outer telescopic slide rail 251 expands under the action of the telescopic shaft rod 255 of the hexagonal concave-convex impeller, and the piston 267 returns to the original state. This process is one cycle. With the increase of water in the outer chamber, the piston 267 no longer extracts pure air, but instead extracts a gas-liquid mixture. First, the first layer of gas-liquid separation in the inner chamber is realized in the second flow channel 2610, and then the second layer of gas-liquid separation is realized in the first flow channel 265 until the chamber is filled with water. Then the gas-liquid flow channel 15 begins to fill with water. As the water level rises, the vent valve 14, which floats under the action of the high-speed gas, continues to move upward under the effect of buoyancy. The spire 141 pushes out the embedded movable block 142 and falls into a gap, to close the gas-liquid flow channel 15. This process prevents excess liquid from flowing out.

In the initial state, the magnetic sliding shaft rod 312 of the expandable gas-liquid separation chamber 18 repels the bump of the triangular concave-convex impeller 35 and the magnetic fixed shaft rod 316 attracts the bump of the triangular concave-convex impeller 35. As the drive shaft on the other side starts to rotate, the magnetic sliding shaft rod 312 attracts the bump of the triangular concave-convex impeller 35, and the magnetic fixed shaft rod 316 repels the bump of the triangular concave-convex impeller 35. In this process, the volume of the outer chamber is reduced through the outer chamber wall constriction/expansion device 29 to increase the pressure, the volume of the inner chamber is increased through the inner chamber wall constriction/expansion device 34 to reduce the pressure, the degree of opening of the variable-opening-degree sliding gas-liquid separation shaft rod 36 is increased, the fourth baffle 3613 is opened, and air is discharged from the outer chamber to the inner chamber. At the same time, the lower baffle 286 slides upward, the built-in water inlet 288 moves upward accordingly, water enters the hollow sliding plate 281, and the gas-liquid separation at the water inlet is realized by the built-in impeller 289 of the one-way slide valve. Then, the first layer of gas-liquid separation of the water flow in the inner chamber is realized by the second rotary spiral gas-liquid separation device 30, and the second layer of gas-liquid separation in the outer chamber is realized by the built-in eighth spring 311 of the magnetic telescopic shaft rod 31. When the pressure difference disappears, the fourth baffle 3613 is immediately closed under the action of the eleventh spring 3612, the one-way slide valve 28 is restored to its original state under the action of the sixth spring 285, and the water flow is located at the bottom of the outer chamber.

As the drive shaft on the other side continues to rotate, the magnetic sliding shaft rod 312 no longer attracts the bump of the triangular concave-convex impeller 35 and the magnetic fixed shaft rod 316 no longer repels the bump of the triangular concave-convex impeller 35, but instead, the magnetic sliding shaft rod 312 and the magnetic fixed shaft rod 316 change to the initial state. In this process, the volume of the outer chamber is increased through the outer chamber wall constriction/expansion device 29 to reduce the pressure, the upper baffle 283 slides downward, the built-in water inlet 288 moves downward accordingly, water enters the hollow sliding plate 281, and the gas-liquid separation at the water inlet is realized by the built-in impeller 289 of the one-way slide valve. Then, the first layer of gas-liquid separation of the water flow in the inner chamber is realized by the second rotary spiral gas-liquid separation device 30, and the second layer of gas-liquid separation in the outer chamber is realized by the built-in eighth spring 311 of the magnetic telescopic shaft rod 31. When the pressure difference disappears, the fourth baffle 3613 is immediately closed under the action of the eleventh spring 3612, the one-way slide valve 28 is restored to its original state under the action of the sixth spring 285, and the water flow is located at the bottom of the outer chamber. The volume of the inner chamber is reduced through the inner chamber wall constriction/expansion device 34 to increase the pressure, the degree of opening of the variable-opening-degree sliding gas-liquid separation shaft rod 36 is reduced, and air is discharged from the inner chamber to the gas-liquid flow channel. This process is consistent with that of the gas-liquid separation chamber. This process is one cycle.

With the increase of water in the outer chamber, a gas-liquid mixture, not pure air, enters the inner chamber. The variable-opening-degree sliding gas-liquid separation shaft rod 36 and the built-in impeller 365 and the expandable flow channel 367 of the variable-opening-degree sliding gas-liquid separation shaft rod realize the gas-liquid separation of the outer, middle and inner layers of the inner chamber, until the chamber is filled with water. Then the gas-liquid flow channel begins to fill with water. This process is consistent with that of the gas-liquid separation chamber 17.

The embodiments are preferred embodiments of the present disclosure, but the present disclosure is not limited to the above-mentioned embodiments. Without departing from the spirit of the present disclosure, any obvious improvement, replacement or variation that can be made by the person skilled in the art belongs to the protection scope of the present disclosure.

What is claimed is:

1. A pneumatic type water-free starting self-priming device, having a symmetrical cylinder structure, and comprising a driving device, a gas-liquid separation chamber, and an expandable gas-liquid separation chamber, wherein the gas-liquid separation chamber and the expandable gas-liquid separation chamber are respectively arranged on two sides of the driving device, and gas acceleration channels are symmetrically arranged on the two sides of the driving device; an inner chamber of the gas-liquid separation chamber and an inner chamber of the expandable gas-liquid separation chamber are each connected to an outlet of a corresponding gas acceleration channel through a corresponding gas-liquid flow channel, and a vent valve is arranged at a connection between the outlet of the gas acceleration channel and the gas-liquid flow channel; one-way valves are arranged at an interface between the inner chamber of the gas-liquid separation chamber and the gas-liquid flow channel and at an interface between the inner chamber of the expandable gas-liquid separation chamber and the gas-liquid flow channel, and the one-way valves are arranged symmetrically about a chamber central axis;

drive shafts on the two sides of the driving device are respectively connected to drive shafts of the gas-liquid separation chamber and the expandable gas-liquid separation chamber; the drive shafts on the two sides do not interfere with each other; the driving device uses high-speed gas to drive a drive disk to rotate, to drive the drive shafts to rotate;

a telescopic piston shaft rod in the gas-liquid separation chamber is used to generate a pressure difference between the chamber and outside to suck in water, to realize water suction, gas-liquid separation and water drainage;

the expandable gas-liquid separation chamber uses shrinkage or expansion of volumes of inner and outer chambers thereof to generate a pressure difference to suck in water, to realize water suction, gas-liquid separation and water drainage; and a fixing support is arranged at a bottom of the driving device, the gas-liquid separation chamber and the expandable gas-liquid separation chamber.

2. The pneumatic type water-free starting self-priming device according to claim 1, wherein the driving device comprises, in sequence from outside to inside, an outer shell wall of the driving device, a top gas inlet, inlets of the gas acceleration channels, the gas acceleration channels, an inner shell wall of the driving device, a tapered gas flow channel, A-side gas drive disks, B-side gas drive disks, a rhombic splitting device, a bottom B-side gas inlet, and a bottom A-side gas inlet;

the top gas inlet runs through the outer shell wall of the driving device and the inner shell wall of the driving device and is communicated with a top of the tapered gas flow channel; the bottom A-side gas inlet is provided on one side of the A-side gas drive disks, runs through the outer shell wall of the driving device and the inner shell wall of the driving device, and is communicated with a bottom of the tapered gas flow channel; the bottom B-side gas inlet is provided on one side of the B-side gas drive disks, runs through the outer shell wall of the driving device and the inner shell wall of the driving device, and is communicated with the bottom of the tapered gas flow channel; the rhombic splitting device is arranged at the bottom of the tapered gas flow channel to split air intake at the bottom into an A side and a B side;

the inlets of the gas acceleration channels are respectively communicated with the gas acceleration channels and are symmetrically arranged on the two sides of the driving device; the gas acceleration channels are tapered from bottom to top;

the tapered gas flow channel is symmetrically arranged and is tapered from bottom to top;

a plurality of the B-side gas drive disks are arranged on a drive shaft on the B side;

in a gas inlet to outlet direction, a density of drive disks increases, and a dense point is close to the inlets of the gas acceleration channels; a plurality of gas flow channels and gas outlets corresponding to the gas flow channels are arranged on each of the B-side gas drive disks, a plurality of gas pores are provided on each of the gas flow channels, and pore sizes of the gas pores decrease in a proportion along the gas outlets of the gas flow channels;

the B-side gas drive disks rotate clockwise under the an action of the top gas inlet and the bottom B-side gas inlet; the A-side gas drive disks are of the same structure as the B-side gas drive disks; the A-side gas drive disks and the B-side gas drive disks are arranged on two sides of the top gas inlet; the A-side gas drive disks rotate counterclockwise under an action of the top gas inlet and the bottom A-side gas inlet; and the A-side gas drive disks and the B-side gas drive disks do not interfere with each other during rotation.

3. The pneumatic type water-free starting self-priming device according to claim 2, wherein the gas acceleration channels each comprises a first segment, a second segment and a third segment in sequence, wherein a radius of the second segment is 0.5 times a radius of the first segment, and a radius of the third segment is 0.5 times the radius of the second segment; the tapered gas flow channel is tapered from bottom to top, and a radius of the bottom of the tapered gas flow channel is 5 times a radius of a top of the tapered gas flow channel; three gas flow channels are arranged on each of the B-side gas drive disks, and every two adjacent gas flow channels form an angle of 120°; the gas pores are circular, and radii of the gas pores decrease to 0.8 times for several times toward the gas outlets; and the gas outlets are rectangular.

4. The pneumatic type water-free starting self-priming device according to claim 1, wherein the one-way valves each comprise a first rotating shaft, a first spring and a first baffle, wherein two sides of the first spring are respectively connected to a wall surface of the gas-liquid flow channel and the first baffle;

the vent valve comprises spires, embedded movable blocks, a wing-shaped structure, a fixing support of the vent valve, a telescopic shaft rod of the vent valve, a baffle of the vent valve, a pulley of the vent valve, a vent baffle, a solid block, and a slide rail of the vent valve; the spires are arranged on a wall surface of the gas acceleration channel and at positions corresponding to positions of the embedded movable blocks; the embedded movable blocks are arranged in the wing-shaped structure; a number of the spires and a number of the embedded movable blocks are both 2; the wing-shaped structure is initially arranged at the fixing support of the vent valve; the telescopic shaft rod of the vent valve is connected to the wing-shaped structure and the vent baffle; the vent baffle is connected to the solid block; the solid block is connected to the baffle of the vent valve and the pulley of the vent valve; the baffle of the vent valve is vertically symmetrically arranged with respect to the pulley of the vent valve; the pulley of the vent valve operates in the slide rail of the vent valve; and the slide rail of the vent valve is arranged in the wall surface of the gas-liquid flow channel.

5. The pneumatic type water-free starting self-priming device according to claim 1, wherein the gas-liquid separation chamber comprises, in sequence from outside to inside, water inlets of the gas-liquid separation chamber, an outer shell wall of the gas-liquid separation chamber, spiral gas-liquid separation devices, an inner shell wall of the gas-liquid separation chamber, the telescopic piston shaft rod and a hexagonal concave-convex impeller, wherein the spiral gas-liquid separation devices comprise fixed spiral gas-liquid separation devices and first rotary spiral gas-liquid separation devices; the fixed spiral gas-liquid separation devices are arranged at inlets on two sides, penetrate the inner shell wall of the gas-liquid separation chamber, and each comprise a second rotating shaft, a second baffle, a second spring, first spiral blades, a first rotary disc, an impeller of the fixed spiral gas-liquid separation device and a rotating body; the second rotating shaft is connected to the outer shell wall of the gas-liquid separation chamber and the second baffle; the second spring is connected to the second baffle and the rotating body; the first rotary disc is connected to the rotating body and the impeller of the fixed spiral gas-liquid separation device; the first rotary disc is configured for rotating the impeller of the fixed spiral gas-liquid separation device; a plurality of the first spiral blades are arranged on a surface of the rotating body;

the first rotary spiral gas-liquid separation devices penetrate the inner shell wall of the gas-liquid separation chamber, and a plurality of the first rotary spiral gas-liquid separation devices are arranged, each comprising a second rotary disc, second spiral blades and an impeller of the first rotary spiral gas-liquid separation device; the second rotary disc is of the same structure as the first rotary disc, and is configured for rotating the first rotary spiral gas-liquid separation device and the impeller of the first rotary spiral gas-liquid separation device; a plurality of the second spiral blades are arranged on a surface of each of the first rotary spiral gas-liquid separation devices;

a plurality of the telescopic piston shaft rods are arranged, each comprising a ball of the telescopic piston shaft rod, a fixed shaft rod, a movable shaft rod, a third spring, first flow channels, a glass tube of the telescopic piston shaft rod, a piston, a fourth spring, an impeller of the telescopic piston shaft rod, second flow channels, a piston baffle, a fifth spring, a third rotating shaft and a third baffle; the ball of the telescopic piston shaft rod is arranged in an outer telescopic slide rail and is connected to one end of the fixed shaft rod; the movable shaft rod is connected to the fixed shaft rod, is symmetrically arranged with respect to the third spring, and is arranged in the glass tube of the telescopic piston shaft rod together with the third spring; the first flow channels are arranged outside the glass tube of the telescopic piston shaft rod, and a plurality of the first flow channels are symmetrically arranged with respect to a central line of the fixed shaft rod; the piston is connected to an other end of the fixed shaft rod and each of two sides of the piston is provided with the piston baffle; a plurality of the second flow channels are arranged on the piston baffle on each of the two sides; the fourth spring and the impeller of the telescopic piston shaft rod are arranged in each of the second flow channels; the fifth spring is connected to the piston baffle and the third baffle; the third rotating shaft is connected to the third baffle and the inner shell wall of the gas-liquid separation chamber; the fifth spring, the third rotating shaft and the third baffle are symmetrically arranged with respect to a center of the telescopic piston shaft rod;

the hexagonal concave-convex impeller is provided with an outer telescopic slide rail, shaft beads, a shaft bead slide rail, an external drive shaft of the gas-liquid separation chamber, and telescopic shaft rods of the hexagonal concave-convex impeller; the outer telescopic slide rail surrounds the impeller and has a telescopic effect; the shaft beads are arranged in the shaft bead slide rail, and surround the shaft bead slide rail; the external drive shaft of the gas-liquid separation chamber is coaxial with the B-side gas drive disks, and drives the hexagonal concave-convex impeller to rotate clockwise; and a plurality of the telescopic shaft rods of the hexagonal concave-convex impeller are arranged in the hexagonal concave-convex impeller, and each have one end integrally welded to the shaft bead slide rail and an other end connected to the ball of the telescopic piston shaft rod.

6. The pneumatic type water-free starting self-priming device according to claim 5, wherein two first spiral blades are arranged; two second spiral blades are arranged; three telescopic shaft rods of the hexagonal concave-convex impeller are arranged, and every two adjacent telescopic shaft rods form an angle of 120°; six first flow channels are evenly arranged, with three first flow channels being arranged on each side; and six second flow channels are evenly arranged, with three second flow channels being arranged on each side.

7. The pneumatic type water-free starting self-priming device according to claim 5, wherein four first rotary spiral gas-liquid separation devices are symmetrically arranged with respect to the gas-liquid separation chamber, and every two first rotary spiral gas-liquid separation devices are spaced apart by 60°; the first rotary spiral gas-liquid separation device is spaced apart from the fixed spiral gas-liquid separation device by 60°; and six telescopic piston shaft rods are symmetrically arranged with respect to the gas-liquid separation chamber, and every two adjacent telescopic piston shaft rods are spaced apart by 60°.

8. The pneumatic type water-free starting self-priming device according to claim 1, wherein the expandable gas-liquid separation chamber comprises, in sequence from outside to inside, a water inlet of the expandable gas-liquid separation chamber, a one-way slide valve, an outer shell wall of the expandable gas-liquid separation chamber, second rotary spiral gas-liquid separation devices, an inner shell wall of the expandable gas-liquid separation chamber, variable-opening-degree sliding gas-liquid separation shaft rods and a triangular concave-convex impeller;

the one-way slide valve is arranged in the water inlet of the expandable gas-liquid separation chamber, is of a symmetrical structure, and comprises a hollow sliding plate, an upper fixing block, an upper baffle, a primary slide rail, a sixth spring, a lower baffle, a secondary slide rail, built-in water inlets, a built-in impeller of the one-way slide valve, and a lower fixing block; the hollow sliding plate is hollow inside, and is connected to the secondary slide rail; a water flow enters a flow channel inside the hollow sliding plate through the built-in water inlets; a plurality of the built-in water inlets are arranged; the upper baffle and the lower baffle are connected to the primary slide rail and the secondary slide rail; the upper fixing block limits a movement of the upper baffle toward a top of the hollow sliding plate; the lower fixing block limits a movement of the lower baffle toward a bottom of the hollow sliding plate; the sixth spring is arranged between the upper baffle and the lower baffle the primary slide rail is arranged on a wall surface of the water inlet of the expandable gas-liquid separation chamber; the built-in impeller of the one-way slide valve is arranged inside the hollow sliding plate, and allows a corresponding bottom water flow to pass therethrough;

a plurality of outer chamber wall constriction/expansion devices are arranged at the outer shell wall of the expandable gas-liquid separation chamber, and each comprise a glass tube of the outer chamber wall constriction/expansion device, a piston of the outer chamber wall constriction/expansion device, and a seventh spring; the piston of the outer chamber wall constriction/expansion device is symmetrically arranged with respect to the seventh spring; the piston of the outer chamber wall constriction/expansion device and the seventh spring are both arranged inside the glass tube of the outer chamber wall constriction/expansion device;

the second rotary spiral gas-liquid separation devices are of the same structure as the first rotary spiral gas-liquid separation devices, and a plurality of the second rotary spiral gas-liquid separation devices are arranged;

three magnetic telescopic shaft rods are symmetrically arranged with respect to the expandable gas-liquid separation chamber, every two adjacent magnetic telescopic shaft rods are spaced apart by 120°, and each of the magnetic telescopic shaft rods comprises eighth springs, a magnetic sliding shaft rod, a built-in slide rail, a baffle of the magnetic telescopic shaft rod, a pulley of the magnetic telescopic shaft rod, and a magnetic fixed shaft rod; a plurality of the eighth springs are arranged inside the magnetic sliding shaft rod, and are in an outer chamber section of the expandable gas-liquid separation chamber; magnetism of the magnetic sliding shaft rod repels magnetism of a magnetic bump; the baffle of the magnetic telescopic shaft rod and the pulley of the magnetic telescopic shaft rod are arranged inside the built-in slide rail; the built-in slide rail is connected to the magnetic sliding shaft rod and the magnetic fixed shaft rod; magnetism of the magnetic fixed shaft rod attracts magnetism of a magnetic pit; the magnetic sliding shaft rod is connected to the outer shell wall of the expandable gas-liquid separation chamber and penetrates the inner shell wall of the expandable gas-liquid separation chamber; the magnetic fixed shaft rod is connected to the inner shell wall of the expandable gas-liquid separation chamber; the baffle of the magnetic telescopic shaft rod is symmetrically arranged with respect to the pulley of the magnetic telescopic shaft rod;

inner chamber wall constriction/expansion devices are of the same structure as the outer chamber wall constriction/expansion devices, and a plurality of the inner chamber wall constriction/expansion devices are arranged at the inner shell wall of the expandable gas-liquid separation chamber;

the variable-opening-degree sliding gas-liquid separation shaft rods are of a symmetrical structure, three variable-opening-degree sliding gas-liquid separation shaft rods are arranged with respect to the expandable gas-liquid separation chamber, every two adjacent variable-opening-degree sliding gas-liquid separation shaft rods form an angle of 120°, and each of the variable-opening-degree sliding gas-liquid separation shaft rods comprises a primary ball, a connecting shaft, a secondary ball a constriction/expansion shaft rod, built-in impellers of the constriction/expansion shaft rod, a tenth spring, an expandable flow channel, a slide block, a baffle of the variable-opening-degree sliding gas-liquid separation shaft rod, a pulley of the variable-opening-degree sliding gas-liquid separation shaft rod, a fourth rotating shaft, an eleventh spring and a fourth baffle; the primary ball is movable in a peripheral slide rail, and is connected to the connecting shaft; the secondary ball is connected to the constriction/expansion shaft rod on two sides, to change degrees of opening of the constriction/expansion shaft rod on the two sides; a plurality of the built-in impellers of the constriction/expansion shaft rod are arranged in the constriction/expansion shaft rod; the tenth spring is arranged in the expandable flow channel, and two ends of the tenth spring are connected to the built-in impellers of the constriction/expansion shaft rod on the two sides; the eleventh spring is connected to the constriction/expansion shaft rod and the fourth baffle; the fourth rotating shaft is connected to the inner shell wall of the expandable gas-liquid separation chamber and the fourth baffle; the slide block is connected to the baffle of the variable-opening-degree sliding gas-liquid separation shaft rod and the pulley of the variable-opening-degree sliding gas-liquid separation shaft rod; the baffle of the variable-opening-degree sliding gas-liquid separation shaft rod and the pulley of the variable-opening-degree sliding gas-liquid separation shaft rod are arranged in an inner wall slide rail of the expandable gas-liquid separation chamber; the inner wall slide rail of the expandable gas-liquid separation chamber is arranged in the outer shell wall of the expandable gas-liquid separation chamber; the baffle of the variable-opening-degree sliding gas-liquid separation shaft rod is symmetrically arranged with respect to the pulley of the variable-opening-degree sliding gas-liquid separation shaft rod;

the triangular concave-convex impeller is provided with the peripheral slide rail, the magnetic bump, the magnetic pit, and a drive shaft rod of the expandable gas-liquid separation chamber; and the peripheral slide rail surrounds the impeller, and the drive shaft rod of the expandable gas-liquid separation chamber is coaxial with the A-side gas drive disks, and drives the triangular concave-convex impeller to rotate counterclockwise.

9. The pneumatic type water-free starting self-priming device according to claim 8, wherein two built-in water inlets are symmetrically arranged with respect to the one-way slide valve; and two second rotary spiral gas-liquid separation devices are symmetrically arranged with respect to a center of the expandable gas-liquid separation chamber, and each form an angle of 60° with the magnetic telescopic shaft rod.

10. The pneumatic type water-free starting self-priming device according to claim 8, wherein three outer chamber wall constriction/expansion devices are symmetrically arranged with respect to the outer shell wall of the expandable gas-liquid separation chamber, and every two adjacent outer chamber wall constriction/expansion devices form an angle of 120°; three inner chamber wall constriction/expansion devices are evenly arranged on the inner shell wall of the expandable gas-liquid separation chamber, and every two adjacent inner chamber wall constriction/expansion devices form an angle of 120°; and three eighth springs are evenly arranged.

* * * * *